United States Patent
Choi et al.

(10) Patent No.: US 12,150,188 B2
(45) Date of Patent: Nov. 19, 2024

(54) ELECTRONIC DEVICE FOR TRANSMITTING RESPONSE MESSAGE IN BLUETOOTH NETWORK ENVIRONMENT AND METHOD THEREFOR

(71) Applicant: Samsung Electronics Co., Ltd., Gyeonggi-do (KR)

(72) Inventors: Jongmu Choi, Gyeonggi-do (KR); Wonkyoung Jang, Gyeonggi-do (KR); Doosuk Kang, Gyeonggi-do (KR); Seongbok Kim, Gyeonggi-do (KR); Seongji Kim, Gyeonggi-do (KR); Gupil Cheong, Gyeonggi-do (KR); Yunmi Ju, Gyeonggi-do (KR); Sungjun Choi, Gyeonggi-do (KR); Inshik Shin, Gyeonggi-do (KR); Bokun Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 496 days.

(21) Appl. No.: 17/435,497

(22) PCT Filed: Feb. 27, 2020

(86) PCT No.: PCT/KR2020/002837
§ 371 (c)(1),
(2) Date: Sep. 1, 2021

(87) PCT Pub. No.: WO2020/180056
PCT Pub. Date: Sep. 10, 2020

(65) Prior Publication Data
US 2022/0141893 A1      May 5, 2022

(30) Foreign Application Priority Data
Mar. 5, 2019   (KR) .................. 10-2019-0025338

(51) Int. Cl.
*H04W 76/14*   (2018.01)
*H04L 5/00*    (2006.01)
(Continued)

(52) U.S. Cl.
CPC ........... *H04W 76/14* (2018.02); *H04L 5/0053* (2013.01); *H04W 4/80* (2018.02); *H04W 24/08* (2013.01); *H04W 76/15* (2018.02)

(58) Field of Classification Search
CPC ....... H04W 76/14; H04W 76/15; H04W 4/80; H04W 24/08
See application file for complete search history.

(56) References Cited

U.S. PATENT DOCUMENTS 7,286,541 B2   10/2007   Koo
7,706,796 B2   4/2010    Rimoni et al.
(Continued)

FOREIGN PATENT DOCUMENTS

KR   2003-0050124 A     6/2003
KR   10-2008-0066768 A  7/2008
(Continued)

OTHER PUBLICATIONS

European Search Report dated Mar. 11, 2022.
Korean Notice of Allowance dated Jan. 2, 2024.

*Primary Examiner* — Won Tae C Kim
(74) *Attorney, Agent, or Firm* — Cha & Reiter, LLC

(57) ABSTRACT

Method comprising: establishing a first link with a first external electronic device, based on the Bluetooth network; receiving information associated with a second link created between the first external electronic device and a second external electronic device, from the first external electronic device; attempting to receive a first data packet transmitted from the second external electronic device by monitoring the second link based at least partially on the information (Continued)

associated with the second link; identifying whether a response message is received from the first external electronic device; transmitting, to the second external electronic device, a response message indicating "ACK" for the first data packet, when the first data packet is normally received, and when the response message is received from the first external electronic device; and withholding a response message for reception of the first data packet, when the first data packet is not normally received.

8 Claims, 15 Drawing Sheets

(51) Int. Cl.
*H04W 4/80* (2018.01)
*H04W 24/08* (2009.01)
*H04W 76/15* (2018.01)

(56) References Cited

U.S. PATENT DOCUMENTS

| | | | |
|---|---|---|---|
| 8,768,252 | B2 | 7/2014 | Watson et al. |
| 9,020,437 | B2 | 4/2015 | Watson et al. |
| 9,621,987 | B2 | 4/2017 | Watson et al. |
| 9,788,117 | B2 | 10/2017 | Watson et al. |
| 9,794,753 | B1 | 10/2017 | Stitt et al. |
| 10,104,474 | B2 | 10/2018 | Watson et al. |
| 10,178,711 | B2 * | 1/2019 | Li .................... H04L 5/0055 |
| 10,499,154 | B2 | 12/2019 | Watson et al. |
| 10,558,427 | B2 | 2/2020 | Jo et al. |
| 2002/0082035 | A1 | 6/2002 | Aihara et al. |
| 2003/0139191 | A1 | 7/2003 | Koo |
| 2007/0049274 | A1 | 3/2007 | Yacobi et al. |
| 2007/0049276 | A1 | 3/2007 | Rimoni et al. |
| 2011/0064058 | A1 | 3/2011 | Rimoni et al. |
| 2012/0058727 | A1 | 3/2012 | Cook et al. |
| 2012/0169535 | A1 | 7/2012 | Kong et al. |
| 2014/0329468 | A1 | 11/2014 | Watson et al. |
| 2015/0304770 | A1 | 10/2015 | Watson et al. |
| 2015/0319557 | A1 | 11/2015 | El-Hoiydi |
| 2017/0188152 | A1 | 6/2017 | Watson et al. |
| 2017/0303080 | A1 | 10/2017 | Stitt et al. |
| 2017/0303090 | A1 | 10/2017 | Stitt et al. |
| 2018/0077493 | A1 | 3/2018 | Watson et al. |
| 2018/0084456 | A1 | 3/2018 | Gostev et al. |
| 2018/0145544 | A1 | 5/2018 | Park et al. |
| 2018/0184234 | A1 * | 6/2018 | Chen .................... H04W 76/14 |
| 2018/0352558 | A1 | 12/2018 | Paycher et al. |
| 2019/0034161 | A1 | 1/2019 | Jo et al. |
| 2019/0044576 | A1 | 2/2019 | Thoen et al. |
| 2020/0205031 | A1 | 6/2020 | Gostev et al. |
| 2020/0288519 | A1 | 9/2020 | Cheong et al. |
| 2020/0396028 | A1 | 12/2020 | Haartsen et al. |
| 2021/0185701 | A1 | 6/2021 | Paycher et al. |
| 2021/0337610 | A1 * | 10/2021 | Yu ............................ H04W 4/80 |

FOREIGN PATENT DOCUMENTS

| | | |
|---|---|---|
| KR | 10-2013-0108662 A | 10/2013 |
| KR | 10-2016-0125048 A | 10/2016 |
| KR | 10-2018-0122407 A | 11/2018 |
| KR | 10-2018-0132541 A | 12/2018 |
| KR | 10-2019-0013062 A | 2/2019 |
| WO | 2019/129748 A1 | 7/2019 |
| WO | 2020/180069 A1 | 9/2020 |

* cited by examiner

ELECTRONIC DEVICE FOR TRANSMITTING RESPONSE MESSAGE IN BLUETOOTH NETWORK ENVIRONMENT AND METHOD THEREFOR

CROSS REFERENCE TO RELATED APPLICATIONS

This application is a National Phase Entry of PCT International Application No. PCT/KR2020/002837, which was filed on Feb. 27, 2020, and claims a priority to Korean Patent Application No. 10-2019-0025338, which was filed on Mar. 5, 2019, the contents of which are incorporated herein by reference.

TECHNICAL FIELD

Certain embodiments in the disclosure relate to an electronic device for transmitting a response message in a Bluetooth network environment and a method thereof.

BACKGROUND ART

A Bluetooth standard technology defined by the Bluetooth special interest group (SIG) defines a protocol for short-range wireless communication between electronic devices. The electronic devices may transmit or receive a data packet including content, such as a text, a voice, an image, or a video, in a specified frequency band (e.g., about 2.4 GHz) in a Bluetooth network environment.

For example, user equipment (UE), such as a smartphone, a tablet, a desktop computer, or a laptop computer, may transmit a data packet to another user equipment or an accessory device over the Bluetooth network environment. The accessory device may include, for example, at least one of an earphone, a headset, a speaker, a mouse, a keyboard, or a display device.

DISCLOSURE

Technical Problem

A smartphone connected a left earphone and a right earphone may have to maintain separate links with each earphone to transmit data packets. This results in increased power consumption and time taken for transmission of the data packets. The foregoing is one example of a user device creating a plurality of links with a plurality of devices.

A topology representing a Bluetooth network environment may include one user device (device under test; DUT) to transmit a data packet and a plurality of devices to receive the data packet from the user device. In the example when a left earphone and right earphone (or a headset) is connected with a smartphone, the left earphone and the right earphone may receive data packets from the smartphone.

Unless the plurality of devices, e.g., the left earphone and the right earphone, to receive the data packet are connected with each other in a wired manner, each of the plurality of devices to receive the data packet may form a separate link with the user device. In this case, the user device has to create a plurality of links to transmit the data packet. Accordingly, the power consumption and the resource consumption of a user may be caused, and the complexity may be increased. In addition, as the number of devices, to which the user device has to transmit data, is increased, the power consumption is increased in the user device and time taken for data packets to reach the plurality of devices is increased.

Aspects of the disclosure are to address at least the above-mentioned problems and/or disadvantages and to provide at least the advantages described below. Accordingly, an aspect of the disclosure is to provide an electronic device to solve the problem in a Bluetooth Network and a method for the same.

Technical Solution

According to an embodiment of the disclosure, an electronic device comprises: a wireless communication circuitry configured to support a Bluetooth network; at least one processor operatively connected with the wireless communication circuitry; and a memory operatively connected with the at least one processor, wherein the memory stores instructions that, when executed, cause the at least one processor to perform a plurality of operations comprising: creating a first link with a first external electronic device, based on the Bluetooth network; creating a second link with a second external electronic device, based on the Bluetooth network; transmitting, to the second external electronic device, information associated with the first link, through the second link; transmitting a response message indicating "ACK" to the second external electronic device through the second link, when a first data packet is normally received from the first external electronic device through the first link; and transmitting a response message indicating "NACK" to the first external electronic device through the first link, when the first data packet is not normally received from the first external electronic device through the first link.

According to an embodiment of the disclosure, an electronic device comprises: a wireless communication circuitry configured to support a Bluetooth network; at least one processor; and a memory operatively connected with the at least one processor, wherein the memory stores instructions that, when executed, cause the at least one processor, the plurality of operations comprising: establishing a first link with a first external electronic device, based on the Bluetooth network; receiving information associated with a second link created between the first external electronic device and a second external electronic device, from the first external electronic device; attempting to receive a first data packet transmitted from the second external electronic device by monitoring the second link based at least partially on the information associated with the second link; identifying whether a response message is received from the first external electronic device; transmitting, to the second external electronic device, a response message indicating "ACK" for the first data packet, when the first data packet is normally received, and when the response message is received from the first external electronic device; and withholding a response message for reception of the first data packet, when the first data packet is not normally received or when the response message is not received from the first external electronic device.

According to an embodiment of the disclosure, a method of an electronic device comprises: creating a first link with a first external electronic device, based on a Bluetooth network; creating a second link with a second external electronic device, based on the Bluetooth network; transmitting, to the second external electronic device, information associated with the first link, through the second link; transmitting a response message indicating "ACK" to the second external electronic device through the second link, when a first data packet is normally received; and transmitting a response message indicating "NACK" to the first external electronic device through the first link, when the first data packet is not normally received.

Advantageous Effects

According to certain embodiments in the disclosure, the electronic device may reduce unnecessary power consumption and time delayed for data processing in the Bluetooth network.

Additionally, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, certain embodiments of the disclosure may be described with reference to accompanying drawings. However, those of ordinary skill in the art will understand that the disclosure is not limited to a specific embodiment, and modifications, equivalents, and/or alternatives on the certain embodiments described herein can be variously made without departing from the scope and spirit of the disclosure.

Figure 1:
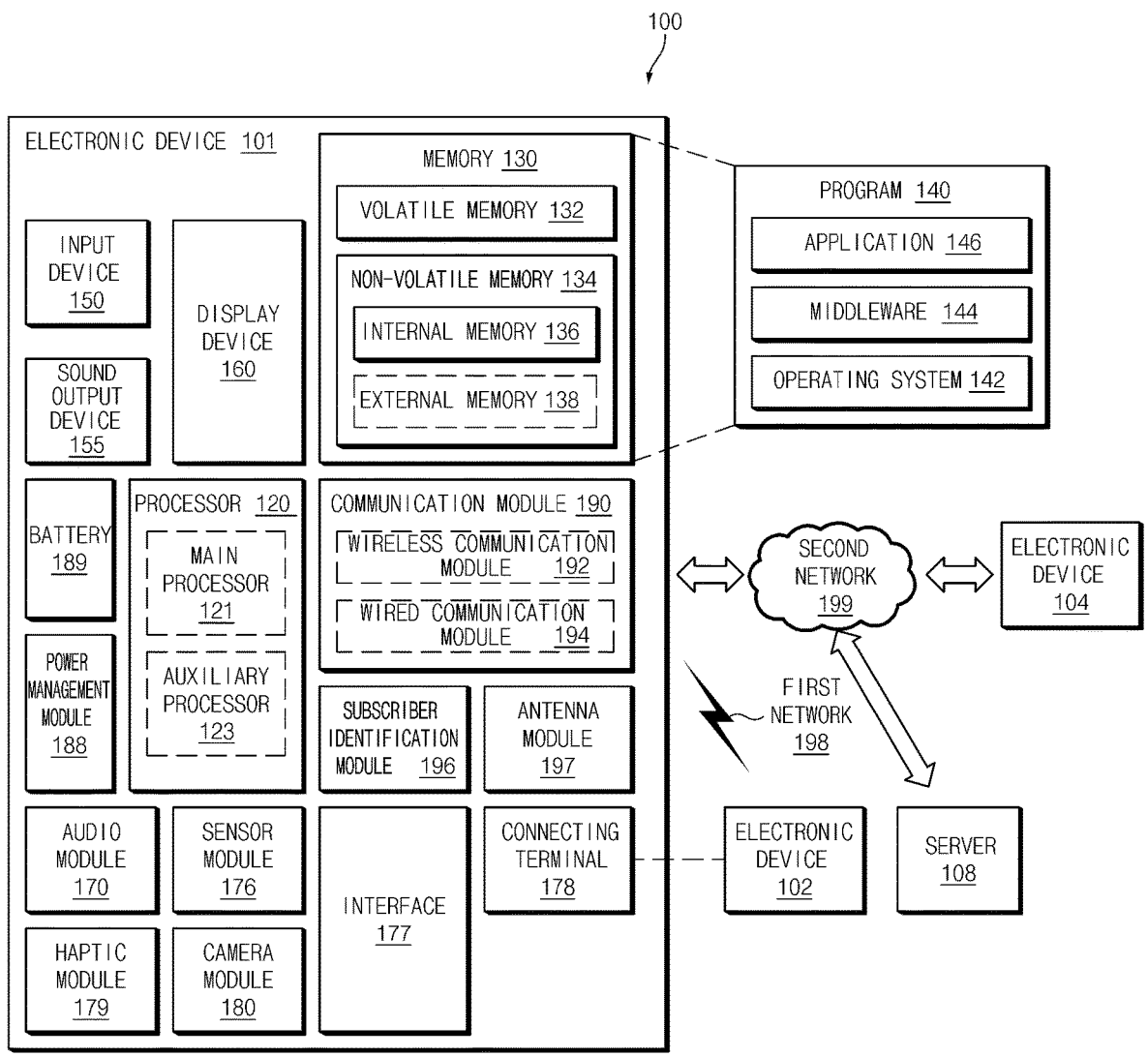
FIG. 1 is a block diagram illustrating an electronic device in a network environment, according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The term processors shall be understood to refer to both the singular and plural contexts.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuitry (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuitry (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
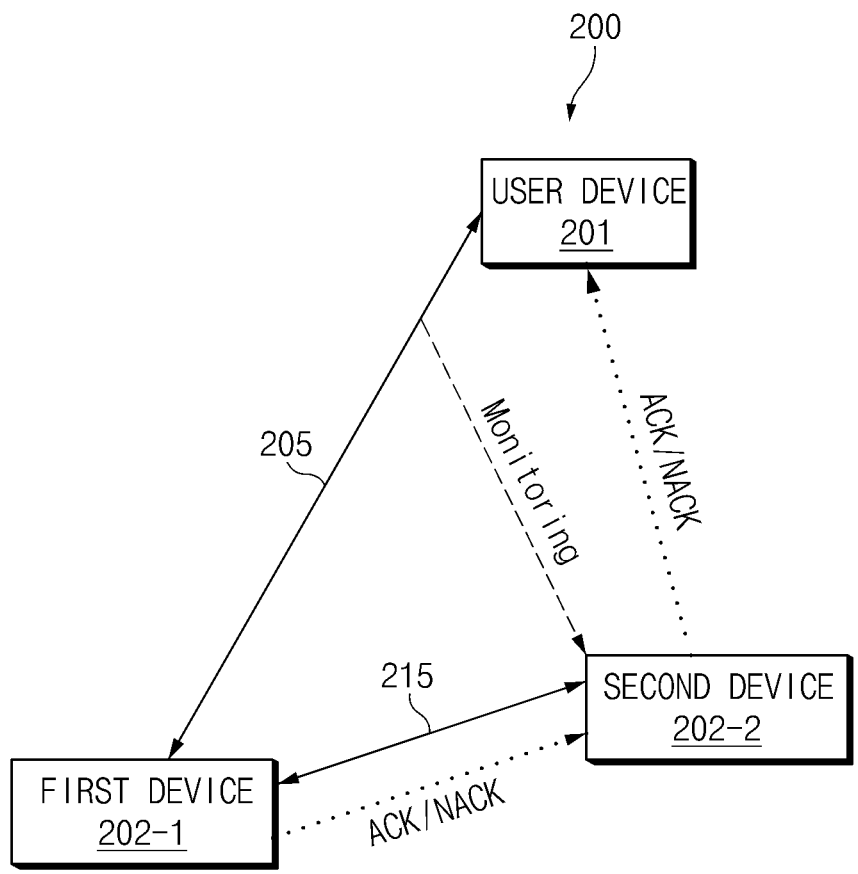
FIG. 2 is a view illustrating a topology of a Bluetooth network environment, according to certain embodiments.

FIG. 2 is a view illustrating a topology 200 of a Bluetooth network environment, according to certain embodiments.

In one example, in FIG. 2, a smartphone as a user device 201 can operate in conjunction with left and right earphones, as the first device 202-1 and second device 202-2.

Establishment by the smartphone 201 of links with the left earphone 202-1 and the right earphone 202-2 would result in increased power consumption as compared to establishment of only one link. According to certain embodiments, the smartphone 201 may establish only the first link 205 to the left earphone 202-1. The smartphone 201 may transmit data packets including content through the first link 205.

The left earphone 202-1 may establish a second link 215 to the right earphone 202-2, and transmit information associated with the first link 205 using the second link 215. The right earphone 202-2 may monitor the first link 205 to receive the data packet including content. The right earphone 202-2 may share the information associated with the first link 205 with the smartphone 201. The smartphone 201 thus reduces power consumption by maintaining a single link 205.

Referring to FIG. 2, a topology 200 includes a user device 201 and devices 202-1 and 202-2. Each of the foregoing can correspond or have similar components as the electronic device 101 of FIG. 1. For example, the user device 201 and the devices 202-1 and 202-2 may establish wireless communication at a short distance depending on a Bluetooth network defined by the Bluetooth SIG. The Bluetooth network may include, for example, a Bluetooth legacy network and a Bluetooth low energy (BLE) network. According to an embodiment, the user device 201 and the devices 202-1 and 202-2 perform wireless communication through one of a Bluetooth legacy network and a BLE network, or perform wireless communication through two networks.

The user device 201 includes, for example, a user terminal, such as a smartphone, a tablet, a desktop computer, or a laptop computer, and the devices 202-1 and 202-2 may include an accessory device such as an earphone, a headset, a speaker, a mouse, a keyboard, or a display device. According to an embodiment, the devices 202-1, and 202-2 may recognize a counterpart device (e.g., the other one of the first device 202-1, or the second device 202-2). Devices 202-1 and 202-2 may recognize the counterpart device in advance or store the information (e.g., address information) about the counterpart device in advance. For example, when the first device 202-1 and the second device 202-2 are accessory devices (e.g., earphones) in a set, the first device 202-1 and the second device 202-2 may recognize each other in advance or store address information of each other in advance.

The user device 201 may function as a master device, the first device 202-1 or the second device 202-2 may function as a slave device. The number of devices functioning as the slave device is not limited to devices illustrated in FIG. 2. According to an embodiment, the function of the devices may be determined in the procedure of generating a link (e.g., a reference numeral 205 or 215) between devices. According to another embodiment, one (e.g., the first device 202-1) of the first device 202-1 and the second device 202-2 serves as a master device, and a remaining one (e.g., the second device 202-2) of the first device 202-1 and the second device 202-2 serves as a slave device.

The master device may control a physical channel. For example, although the master device may transmit a data packet, the slave device may transmit a data packet to the master device only after receiving the data packet. For another example, a channel resource (e.g., a frequency hopping channel) for transmitting of the data packet may be generated based on a clock of the master device. In a Bluetooth legacy network, a time resource (e.g., a time slot) may be determined based on the clock of the master device. The time slot may be, for example, 625 microseconds (μm). In the BLE network, the master device and the slave device may transmit a data packet at a specified interval, and may make a response after a specified time (e.g., The Inter Frame Space (T_IFS); about 150 μm) when receiving the data packet.

According to an embodiment, the user device 201 may transmit a data packet including content (such as a text, a voice, an image, or a video), to the devices 202-1 and 202-2. At least one of the devices 202-1 or 202-2 may transmit the data packet, as well as the user device 201, depending on the type of content included in the data packet. For example, when music is reproduced in the user device 201, a data packet may be transmitted only by the user device 201. To the contrary, when the user device 201 makes a call, at least one of devices 202-1 or 202-2 as well as the user device 201 may transmit the data packet including content (e.g., voice data) to the user device 201. When only the user device 201 transmits the data packet, the user device 201 is considered a source and the devices 202-1 and 202-2 are considered sink devices.

When the user device 201 creates (or establishes) a plurality of links to the devices 202-1 and 202-2 to transmit a data packet, the resource consumption, the power consumption, or the complexity may be increased in the user device 201. Accordingly, the user device 201 may establish only the first link 205 to the first device 202-1 and may transmit the data packet through the first link 205. In this case, at least one another device (e.g., reference numeral 202-2) may monitor the first link 205 to receive the data packet including content. In this case, the user device 201 may be referred to as a device under test (DUT), the first device 202-1 may be referred to as a primary earbud (PE) or primary equipment (PE), and the at least one another device (e.g., reference numeral 202-2) may be referred to as a secondary earbud (or secondary equipment).

According to an embodiment, the first device 202-1 may establish a second link 215 to the second device 202-2 and transmit information associated with the first link 205. The second device 202-2 monitors the first link 205 and transmits the response message to the user device 201. The information associated with the first link 205 may include address information (e.g., the Bluetooth address of the master device of the first link 205, the Bluetooth address of the user device 201, and/or the Bluetooth address of the first device 202-1), piconet clock information (e.g., clock native (CLK) of a master device of the first link 205), logical transport (LT) address information (e.g., information assigned by the master device of the first link 205), used channel map information, link key information, service discovery protocol (SDP) information (e.g., service and/or profile information associated with the first link 205), and/or supported feature information. The information associated with the first link 205 may further include, for example, an extended inquiry response packet (EIR). The EIR packet may include resource control information and/or information on a manufacturer of the first link 205. The second device 202-2 may receive the data packet sent from the user device 201 to the first device 202-1 using information received from the first device 202-1. This obviates the need for creating a link between the user device 201 and the second device 202-2. By obviating the need for the link between the user device 201 an the second device 202-2, power consumption is reduced.

Although not illustrated in FIG. 2, according to another embodiment, when the first device 202-1 and the second device 202-2 support the same user account or a similar user account (e.g., a family account), the first device 202-1 and the second device 202-2 may share information associated with the first link 205 through an external server (not illustrated) internetworking with the first device 202-1 or the second device 202-2 based on the same or similar user account. In this case, the topology 200 may further include the external server (not illustrated). For example, the first device 202-1 transmits information associated with the first link 205 to the external server (not illustrated), and the external server (not illustrated) transmits information associated with the first link 205 to the second device 202-2.

According to another embodiment, the second device 202-2 may share the information associated with the first link 205 with the user device 201. For example, the user device 201 may transmit the information associated with the first link 205 to the second device 202-2 through a separate link (not illustrated), and may release the separate link when the information associated with the first link 205 is completely transmitted.

According to an embodiment, the first device 202-1 or the second device 202-2 may transmit a response message to notify that the data packet is normally received. In the disclosure, the data packet normally received may refer to that data is successfully processed (e.g., decoded or parsed) as well as that a signal including the data is successfully received. The response message may include a positive acknowledgment (ACK) message indicating that the expected data packet is normally received and a negative acknowledgment (NACK) message indicating that the data packet is not normally received (or the received data is not normally processed). The response message may include, for example, 1-bit information. When the ACK message is received after the data packet is transmitted, the user device 201 may transmit a next data packet. When the NACK message is received or no response message is received within a specified time, the user device 201 may transmit the same data packet.

Although the second device 202-2 may transmit a response message to the first device 202-1 through the second link 215, the first device 202-1 has to use a portion of the assigned resources to receive the data packet from the user device 201. Accordingly, resources may be wasted. When the portion of the resources of the first device 202-1 is used, the user device 201 may not receive a response message or the reception of the response message may be delayed. Accordingly, the performance in the transmission of the data packet may be degraded or the power consumption may be increased. In addition, as the number of devices (e.g., reference numeral 202-2) having no link with the user device 201 is increased, the time taken for the first device 202-1 to confirm the reception of the data packet from another device (e.g., reference numeral 202-2) may be increased.

According to certain embodiments, the second device 202-2 may transmit the response message directly to the user device 201 by using the information associated with the first link 205, without passing through the first device 202-1. For example, the second device 202-2 may generate an access code and address information (e.g., LT address information) corresponding to the first link 205 based on address information included in the information associated with the first link 205. The second device 202-2 can then transmit a response message including the generated access code and address information to the user device 201.

The user device 201 may establish a single link (e.g., the first link 205) together with a single device (e.g., the first device 202-1). Accordingly, the user device 201 may determine whether to retransmit the data packet, based on the type of a response message, which is first received, instead of considering all response messages transmitted from the first device 202-1 and the second device 202-2.

According to certain embodiments, the first device 202-1 and the second device 202-2 may determine a manner for transmitting the response message through negotiation. According to an embodiment, the first device 202-1 and the second device 202-2 may perform the negotiation such that the second device 202-2 transmits a message indicating "ACK" to the user device 201, and the first device 202-1 transmits a message indicating "NACK" to the user device 201. According to another embodiment, the first device 202-1 and the second device 202-2 may alternately perform a function of transmitting the message indicating "ACK" to the user device 201 and a function of transmitting the message indicating "NACK" to the user device 201, in every specific period (the specific number of times). For example, when the first device 202-1 transmits a message indicating "ACK" for a first data packet, the second device 202-2 may transmit a message indicating "ACK" for a second data packet corresponding to a data packet next to the first data packet.

Even the second device 202-2 as well as the first device 202-1 may transmit the response message to the user device 201. Accordingly, the complexity of the user device 201 in generating a link may be reduced and the balance in power consumption of the first device 202-1 and the second device 202-2 may be improved.

Figure 3:
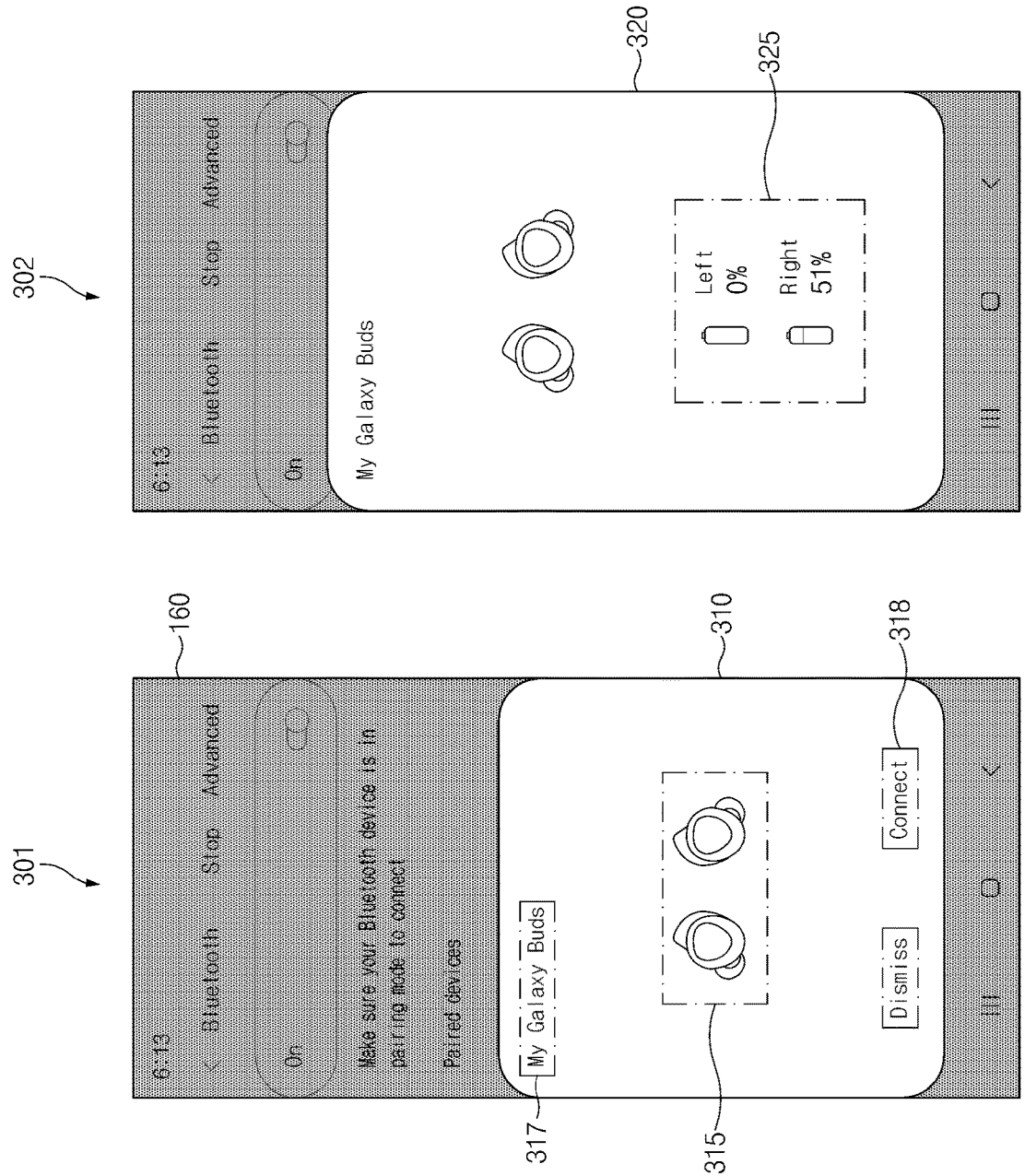
FIG. 3 is a user interface (UI) showing the connection between devices in a Bluetooth network environment, according to certain embodiments.

The user device 201 can be connected to first and second devices 202-1, 202-2, using an interface, such as the interface shown in FIG. 3. The user device 201 can receive an advertising signal including information The advertising signal can indicate whether the first device 202-1 forms a set together with second device 202-2, such as an image 315. When the user requests pairing, e.g., touching button 318, the user device 201 automatically establishes the first link 205 with the first device 202-1. The user device 201 then displays interface 320.

FIG. 3 is a user interface showing the connection between devices in a Bluetooth network environment, according to certain embodiments. Although FIG. 3 illustrates a set (the two earbuds inside box 315), the same principle may be applied to only one device.

Referring to FIG. 3, in reference numeral 301, the user device 201 may recognize the left ear bud by receiving an advertising signal transmitted therefrom. The user device 201 may display a first user interface 310 for notification to users of the left ear bud and the right ear bud configured together in a set. In certain embodiments, the left ear bud can correspond to the first device 202-1 in FIG. 2, and the right ear bud can correspond to the second device 202-2.

The first user interface 310 may include at least one of an image 315 showing, for example, the shapes of the first device 202-1 and the second device 202-2 or a text 317 showing names (e.g., My Galaxy Buds) of the first device 202-1 and the second device 202-2. For another example, although not illustrated in FIG. 3, the first user interface 310 may show whether the first device 202-1 or the second device 202-2 has been previously connected.

According to an embodiment, the advertising signal may include information on connection (or pairing) between the user device 201 and the first device 202-1. For example, the advertising signal may include identification information of the first device 202-1, user account information, current pairing information indicating whether the first device 202-1 is current pairing with another device, a pairing list indicating a list of previously paired devices with the first device 202-1, simultaneous paring information indicating devices that are able to be simultaneously paired with the first device 202-1, transmit power, a sensing area, or information on a battery status. For example, when the first device 202-1 forms a set together with the second device 202-2, the advertising signal may include the identification information, or user account information of the second device 202-2, current pairing information indicating whether the second device 202-2 is pairing with another device, a pairing list indicating a list of previously paired devices with the second device 202-2, simultaneous paring information indicating devices that are able to be simultaneously paired with the second device 202-2, or transmit power, a sensing area, or information on a battery status of the second device 202-2.

According to an embodiment, the first device 202-1 may transmit the advertising signal through a multicast manner or a broadcast method.

According to an embodiment, the first device 202-1 may transmit the advertising signal depending on a specified condition. For example, the first device 202-1 may transmit the advertising signal in response to sensing that a case having the first device 202-1 is open. For another example, the first device 202-1 may transmit the advertising signal, in response to that the power is supplied or that the user input is received. For example, the first device 202-1 may transmit the advertising signal in a specified period.

According to an embodiment, the user device 201 may automatically establish the first link 205 (e.g., the first link 205) together with the first device 202-1 in response to receiving a user input 318 for requesting for the connection with the first device 202-1 or without a user input. According to an embodiment, the user device 201 and the first device 202-1 may establish the first link 205 in a procedure based on a Bluetooth standard. For example, the user device 201 and the first device 202-1 may use a baseband page procedure, a link manager protocol (LMP) version, a clock offset to recognize a counterpart device, and LMP procedures to identify a supported function (e.g., supported features), host connection/response (request/response) procedures to confirm connectivity, an authentication procedure to verify whether the counterpart device is a trusted device, an encryption procedure, and a setup complete procedure to notify the completion of the connection (e.g., the first link 205) to the host.

When the first link 205 is established, the user device 201 may output, through the display device 160, a second user interface 320 showing that the first device 202-1 is connected with the user device 201, as illustrated in reference numeral 302. The second user interface 320 may further include, for example, an image 325 showing battery statuses of the first electronic device 202-1 and the second device 202-2 forming a set together with the first electronic device 202-1.

Although not illustrated in FIG. 3, according to an embodiment, when the first device 202-1 is discovered, in the state that the user device 201 is previously connected with an external device other than the first device 202-1 and the second device 202-2, the user device 201 may transmit information on a previously-established link to the first device 202-1 or the second device 202-2, such that the first device 202-1 or the second device 202-2 monitors the previously-established link between the user device 201 and the external device. In this case, the first user interface 310 may include information indicating that the first device 202-1 or the second device 202-2 is added. When a user input to request for addition of the first device 202-1 or the second device 202-2 is received, the user device 201 may transmit the information on the previously-established link to the first device 202-1 or the second device 202-2.

Figure 4:
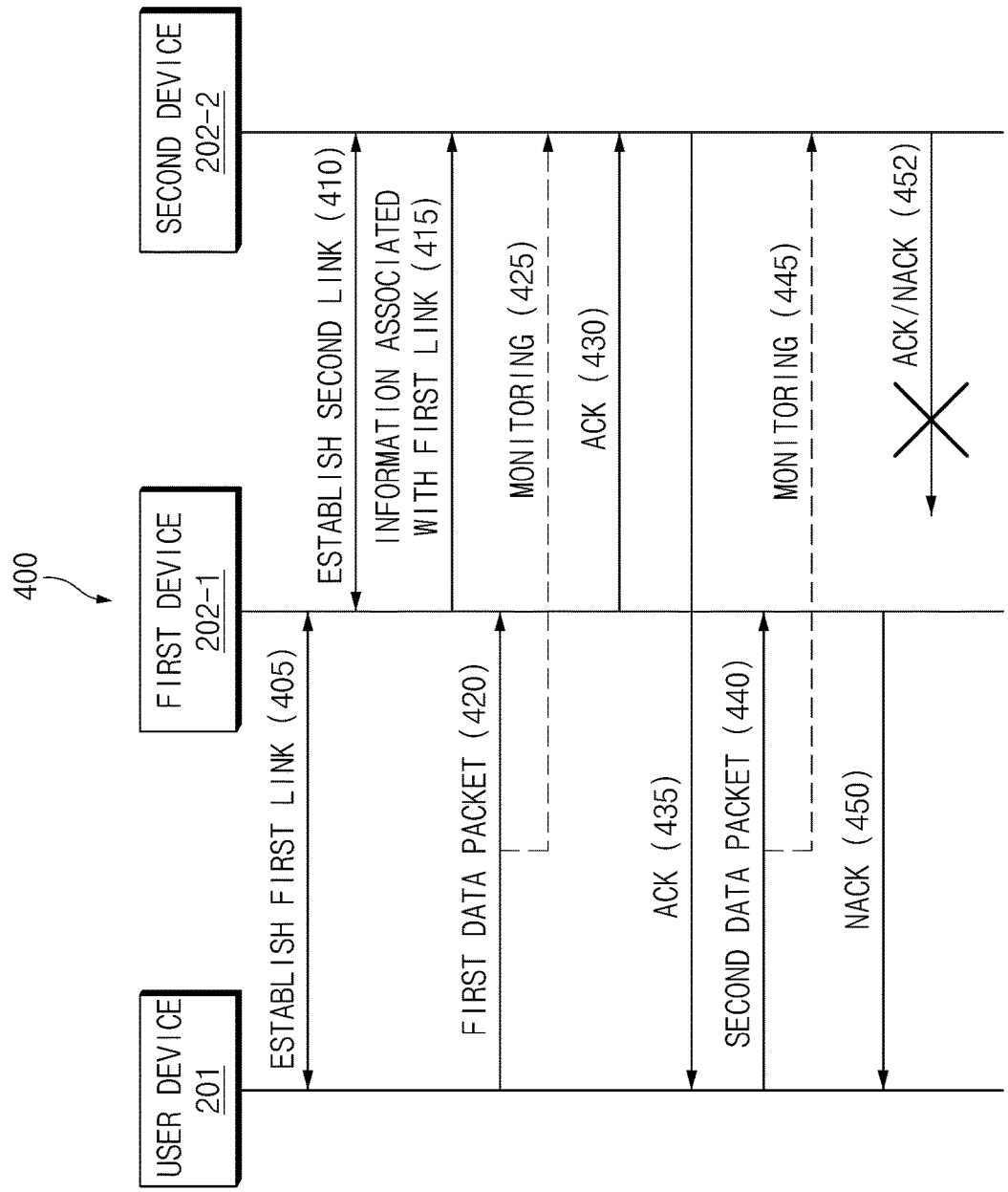
FIG. 4 illustrates a signal flowchart for transmitting a response message, according to certain embodiments.

FIG. 4 illustrates a signal flowchart 400 for transmitting a response message, according to certain embodiments.

FIG. 4 illustrates a signal flow diagram where a first device 202-1 and second device 202-2 receive data packets from the user device 201, while the user device 201 only maintains a single link with first device 202-1. The user device 201 transmits data packets over a link between the user device 201 and the first device (established during operation 405). The second device 202-2 receives the data packets by monitoring the first link in operations 425 and 445. The first device 202-1 transmits ACK to the second device 202-2, and transmits NACKs to the user device 201.

Referring to FIG. 4, in operation 405, the user device 201 may establish a first link (e.g., the first link 205 of FIG. 2) with the first device 202-1.

In operation 410, the first device 202-1 may establish a second link (e.g., the second link 215 of FIG. 2) with the second device 202-2. According to one embodiment, the first device 202-1 may establish the second link 215 with the second device 202-2 before establishing the first link 205 with the user device 201.

In operation 415, the first device 202-1 may transmit information associated with the first link 205 to the second device 202-2. The information associated with the first link 205 may include, for example, at least one of address information, clock information, channel information, SDP result information, information on supported functions, key information, or an EIR packet.

According to other embodiments, the first device 202-1 may transmit the information associated with the first link 205 to the second device 202-2 before establishing the second link 215 or during the procedure of establishing the second link 215. According to other embodiments, the first device 202-1 may transmit the information associated with the first link 205 to the second device 202-2 through an external server (not illustrated). For example, the first device 202-1 transmits the information associated with the first link 205 to the external server (not illustrated) after establishing the first link 205, and the external server (not illustrated) may transmit the information associated with the first link 205 to the second device 202-2.

In operation 420 and operation 440, the user device 201 may transmit a data packet (e.g., a first data packet or a second data packet) including content to the first device 202-1 through the first link 205. The second data packet may correspond to a data packet next to the first data packet. Although not illustrated in FIG. 4, when receiving the response message indicating "NACK" after transmitting the first data packet, the user device 201 may retransmit the same data packet (e.g., the first data packet) in operation 440.

In operation 425 and operation 445, the second device 202-2 may monitor the first link 205, based on at least a portion (e.g., address information or clock information) of information associated with the first link 205. The second device 202-2 may receive the same data packet as the data packet (e.g., the first data packet or the second data packet) received by the first device 202-1 through the monitoring operation. Operation 425 and operation 445 may be referred to as "shadowing" or "snooping".

According to certain embodiments, the first device 202-1 and the second device 202-2 may transmit a response message to the first data packet or the second data packet based on a manner which is previously negotiated.

The first device 202-1 may transmit, to the second device 202-2, the response message indicating "ACK" through the second link 215, when the data packet (e.g., the first data packet) is normally received (e.g., operation 430). The first device 202-1 may transmit, to the user device 201, the response message indicating "NACK" through the first link 205, when the data packet (e.g., the second data packet) is not normally received (operation 450). According to an embodiment, the first device 202-1 may transmit the response message indicating "ACK" through at least one of broadcasting, the second link 215, a non-audible tone, a unidirectional wireless link, a skin vibration pattern, or a light signal pattern. When the response message is broadcasted, the first device 202-1 may regulate transmit power for transmitting the response message, such that the second device 202-2 receives the response message and the user device 201 is prevented from receiving the response message. For example, the first device 202-1 may set the transmit power to be lower than a threshold value. The threshold value may be determined based on the distance between the first device 202-1 and the user device 201.

The second device 202-2 may transmit the response message or may not transmit the response message, based at least on the type of the response message received from the first device 202-1 or whether the second device 202-2 normally receives the data packet through monitoring. For example, the second device 202-2 may transmit the response message indicating "ACK" to the user device 201, based on the information associated with the first link 205 in operation 435, when receiving the response message indicating "ACK" from the first device 202-1 and normally receiving the first data packet. Although not illustrated in FIG. 4, the second device 202-2 may not transmit the response message to the user device 201, when the second device 202-2 receives the response message indicating "ACK" from the first device 202-1, and fails to normally receive the first data packet. For another example, the second device 202-2 may not transmit the response message in operation 452, regardless of whether the second device 202-2 normally receives the second data packet, when the second device 202-2 fails to receive the response message to the second data packet from the first device 202-1 within a specified time or receives the response message indicating "NACK" from the first device 202-1.

Although FIG. 4 illustrates that the first device 202-1 transmits the response message indicating "NACK" to the user device 201, and the second device 202-2 transmits the response message indicating "ACK" to the user device 201, according to other embodiments, the first device 202-1 may transmit the response message indicating "ACK" to the user device 201, and the second device 202-2 may transmit the response message indicating "NACK" to the user device 201.

According to an embodiment, the first device 202-1 and the second device 202-2 may negotiate a manner for transmitting a response message based on certain embodiments. According to an embodiment, the manner for transmitting the response message may be negotiated before operation 410, after operation 410, before operation 415, or after operation 415. According to other embodiments, the first device 202-1 and the second device 202-2 may negotiate the manner for transmitting the response message during operation 410 and operation 415, instead of negotiation through the additional procedure. For example, the first device 202-1 and the second device 202-2 may negotiate the manner for transmitting the response message, depending on functions of the master device and the slave device determined during establishing the second link 215. In this case, the first device 202-1 and the second device 202-2 may make determination such that a device (e.g., the first device 202-1) to perform the function of the master device may transmit the message indicating "NACK", and a device (e.g., the second device 202-2) to perform the function of the slave device may transmit the message indicating "ACK". To the contrary, the first device 202-1 and the second device 202-2 may make determination such that the device (e.g., the first device 202-1) to perform the function of the master device may transmit the message indicating "ACK", and the device (e.g., the second device 202-2) to perform the function of the slave device may transmit the message indicating "NACK".

For another example, the first device 202-1 and the second device 202-2 may negotiate a manner for transmitting a response message, based on a subject to transmit the information associated with the first link 205. In this case, the first device 202-1 and the second device 202-2 may make determination such that a device (e.g., the first device 202-1)

to transmit the information associated with the first link 205 transmits the response message indicating "NACK" and a device (e.g., the second device 202-2) to receive the information associated with the first link 205 receives the response message indicating "ACK". In this case, the first device 202-1 and the second device 202-2 may make determination such that the device (e.g., the first device 202-1) to transmit the information associated with the first link 205 transmits the response message indicating "ACK" and the device (e.g., the second device 202-2) to receive the information associated with the first link 205 receives the response message indicating "NACK".

Although not illustrated in FIG. 4, in response to receiving the response message indicating "NACK", the user device 201 may directly retransmit the same data packet or the first device 202-1 may relay a data packet. In this case, the user device 201 may request the first device 202-1 to relay the data packet.

Figure 5A:
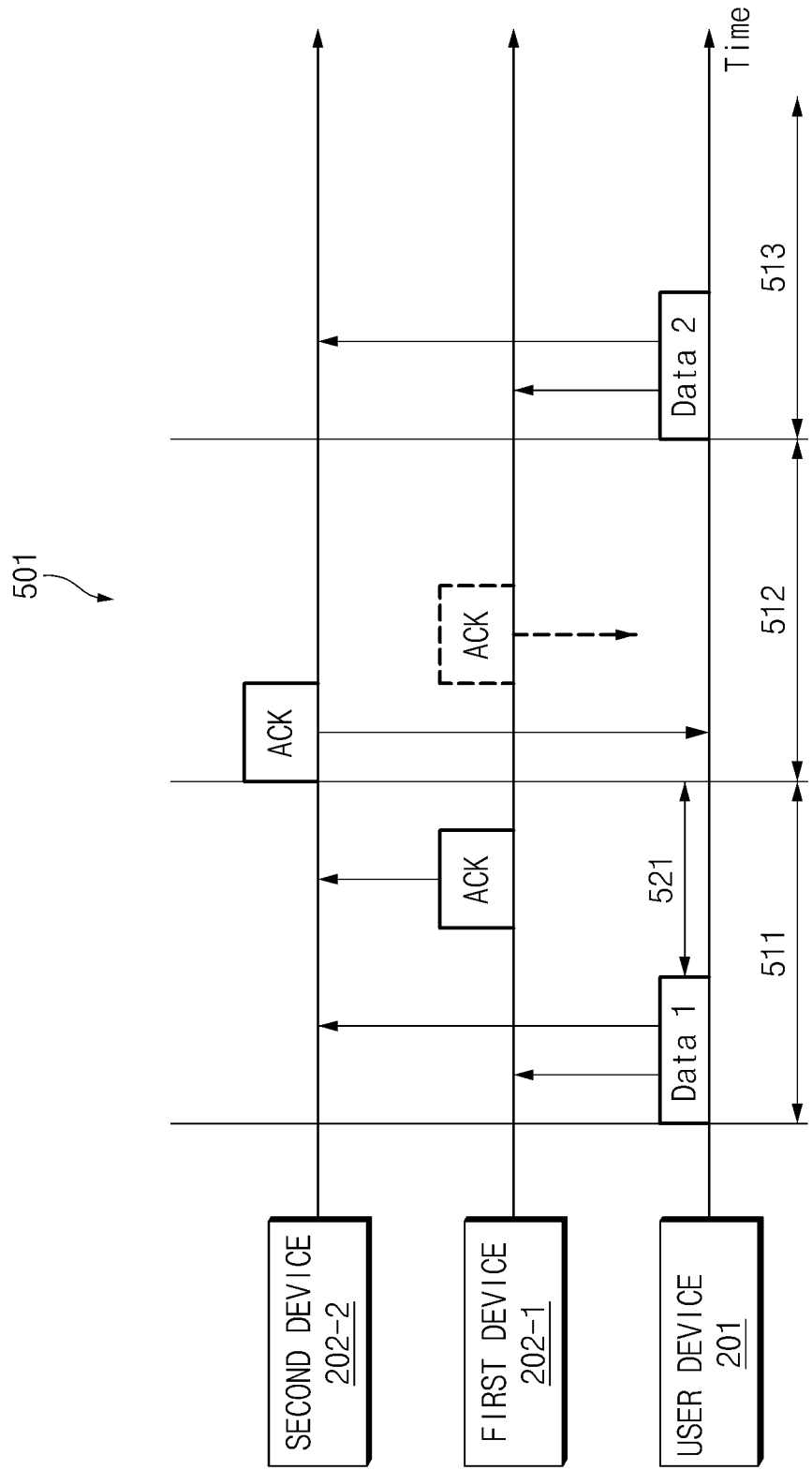
FIG. 5A is a view illustrating an operation of transmitting a response message, according to certain embodiments.
Figure 5B:
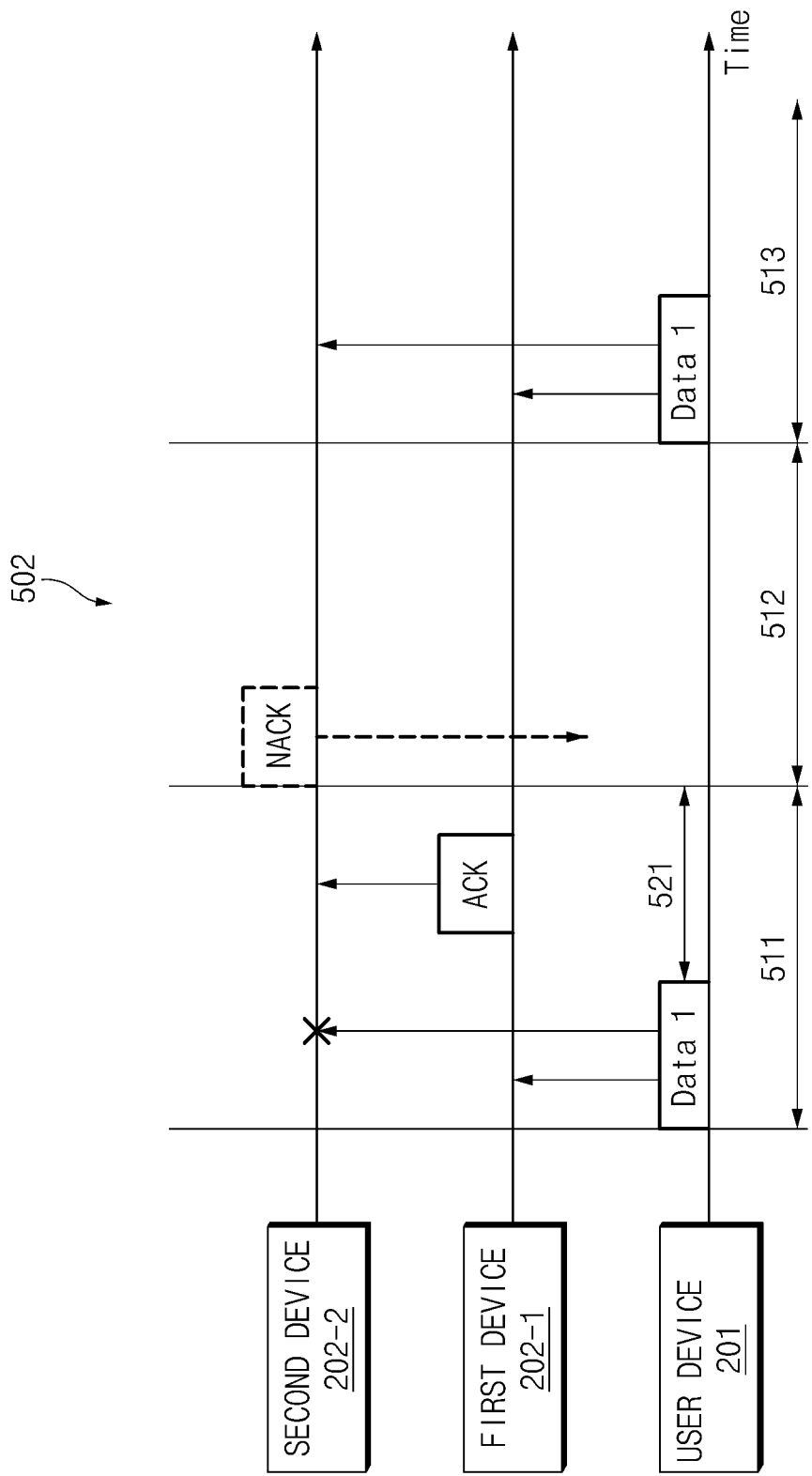
FIG. 5B is a view illustrating an operation of transmitting a response message, according to certain embodiments.
Figure 5C:
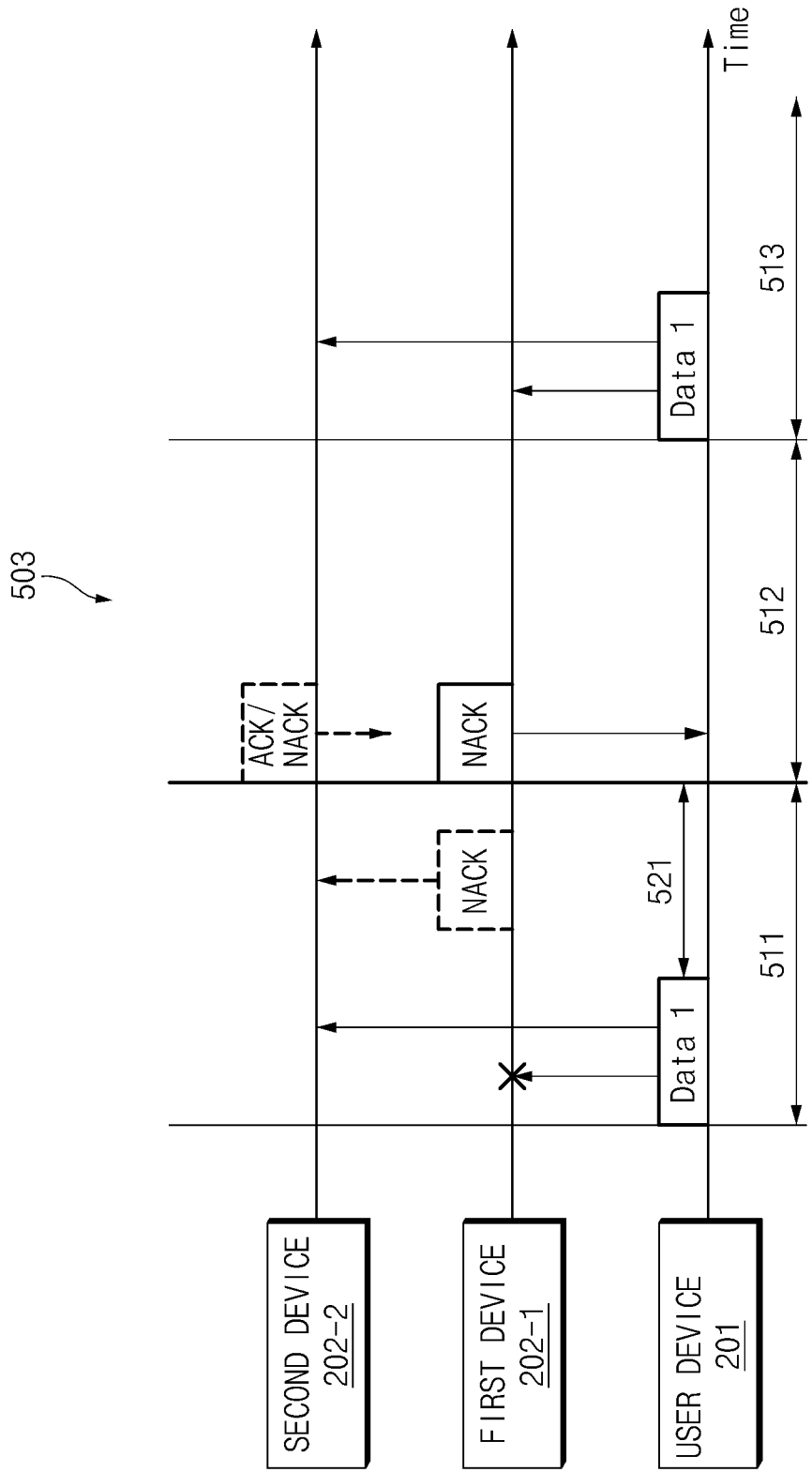
FIG. 5C is a view illustrating an operation of transmitting a response message, according to certain embodiments.

FIGS. 5A to 5C are timing diagram describing the pattern of ACK and NACK messages in response to transmission of data packets. When the data is successfully received, the first device 202-1 transmits an ACK to the second device 202-2 (see FIG. 5A, 511). However, when the data is not successfully received, the first device 202-1 transmits a NACK to the user device 201 (see FIG. 5C, 512).

FIGS. 5A to 5C are views illustrating an operation of transmitting a response message, according to certain embodiments. Although FIGS. 5A to 5C illustrate that the first device 202-1 transmits the response message indicating "NACK", and the second device 202-2 transmits the response message indicating "ACK", the same principle may be applied to an embodiment in which the first device 202-1 may transmit the response message indicating "ACK", and the second device 202-2 may transmit the response message indicating "NACK".

Referring to FIGS. 5A to 5C, horizontal axes of graph 501, graph 502, and graph 503 represent time. The user device 201 may transmit a first data packet in a first slot 511 (e.g., a transmit slot (Tx slot)) and may receive a response message in a second slot 512 (e.g., a receive slot (Rx slot)) corresponding to a slot next to the first slot. The user device 201 may retransmit the first data packet or transmit a second data packet corresponding a data packet next to the first data packet, in a third slot 513 (e.g., the transmit slot) corresponding to the slot next to the second slot 512.

FIG. 5A may illustrate that the first device 202-1 and the second device 202-1 normally receive the first data packet. The first device 202-1 may transmit the response message indicating "ACK" to the second device 202-2 for a second time interval 521 in the first slot 511 except for the first time interval for which the first data packet is transmitted. According to an embodiment, the first device 202-1 may calculate the second time interval 521 in the first slot 511, depending on a packet type of the data packet received from the user device 201. Because the wireless communication circuitry (e.g., at least a portion of the wireless communication module 192 of FIG. 1) of the second device 202-2 attempts to receive data in the first slot 511, the wireless communication circuitry may receive a response message from the first device 202-1 for the second time interval 521. According to an embodiment, the first device 202-1 may transmit the response message indicating "ACK" through at least one of broadcasting, the second link 215, a non-audible tone, a unidirectional wireless link, a skin vibration pattern or a light signal pattern.

The response message indicating "ACK" is received from the first device 202-1 and the second device 202-2 normally receives the first data packet. Accordingly, the second device 202-2 may transmit the response message indicating "ACK" to the user device 201 in the second slot 512. In this case, the first device 202-1 may not transmit a response message in the second slot 512, or may adjust the transmit power to be a first threshold value or less to prevent the user device 201 from receiving the response message. For example, the threshold value may be determined based on the distance between the first device 202-1 and the user device 201. When the first device 202-1 adjusts the transmit power and transmits a response message, the first device 202-1 may transmit the response message at the substantially same time point as a time point in which the second device 202-2 transmits a response message.

The user device 201 may transmit the second data packet in the third slot 513 in response to the response message indicating "ACK" received in the second slot 512.

FIG. 5B illustrates that the first device 202-1 normally receives the first data packet and the second device 202-2 fails to normally receive the first data packet. The first device 202-1 may transmit the response message indicating "ACK" for the second time interval 521 included in the first slot 511. Even if the second device 202-2 receives a response message indicating "ACK" from the first device 202-1, the second device 202-2 may not transmit a response message, because the second device 202-2 fails to normally receive the first data packet. For another example, even if the user device 201 fails to receive the response message from the second device 202-2, the second device 202-2 may adjust transmit power for transmitting the response message to be a second threshold or less. The second threshold value may be determined based on the distance between the user device 201 and the second device 202-2.

The user device 201 may retransmit the first data packet in the third slot 513, because the user device 201 fails to receive the response message in the second slot 512.

FIG. 5C illustrates that the first device 202-1 fails to normally receive the first data packet. The first device 202-1 may transmit a response message indicating "NACK" to the user device 201 in the second slot 512. For another example, the first device 202-1 may transmit, to the second device 202-2, the response message indicating "NACK" for the second time interval 521 included in the first slot 511, to notify the second device 202-2 of whether the first device 202-1 normally receives the first data packet.

The second device 202-2 may not transmit the response message in the second slot 512 regardless of whether the second device 202-2 normally receives the first data packet, because the response message is not received from the first device 202-1. For another example, the second device 202-2 may adjust transmit power for transmitting the response message to be the second threshold or less, such that the user device 201 fails to receive the response message from the second device 202-2.

The user device 201 may retransmit the first data packet in the third slot 513, because the response message indicating "NACK" is received in the second slot 512.

In certain embodiments, ACK messages can be transmitted to the user device 201, in alternating fashion. When the data is received by both the first and second devices 202-1 and 202-2, in one cycle 511-512, the first device 202-1 can transmit an ACK to the second device 202-2, and the second device 202-2 transmits an ACK directly to the user device 201. When the data is received by both the first and second devices 202-1 and 202-2, in cycle 513-514, the second device 202-2 can transmit an ACK to the first device 202-1, and the first device 202-1 transmits an ACK to the user device 201. The foregoing can be repeated in alternating fashion.

Figure 6:
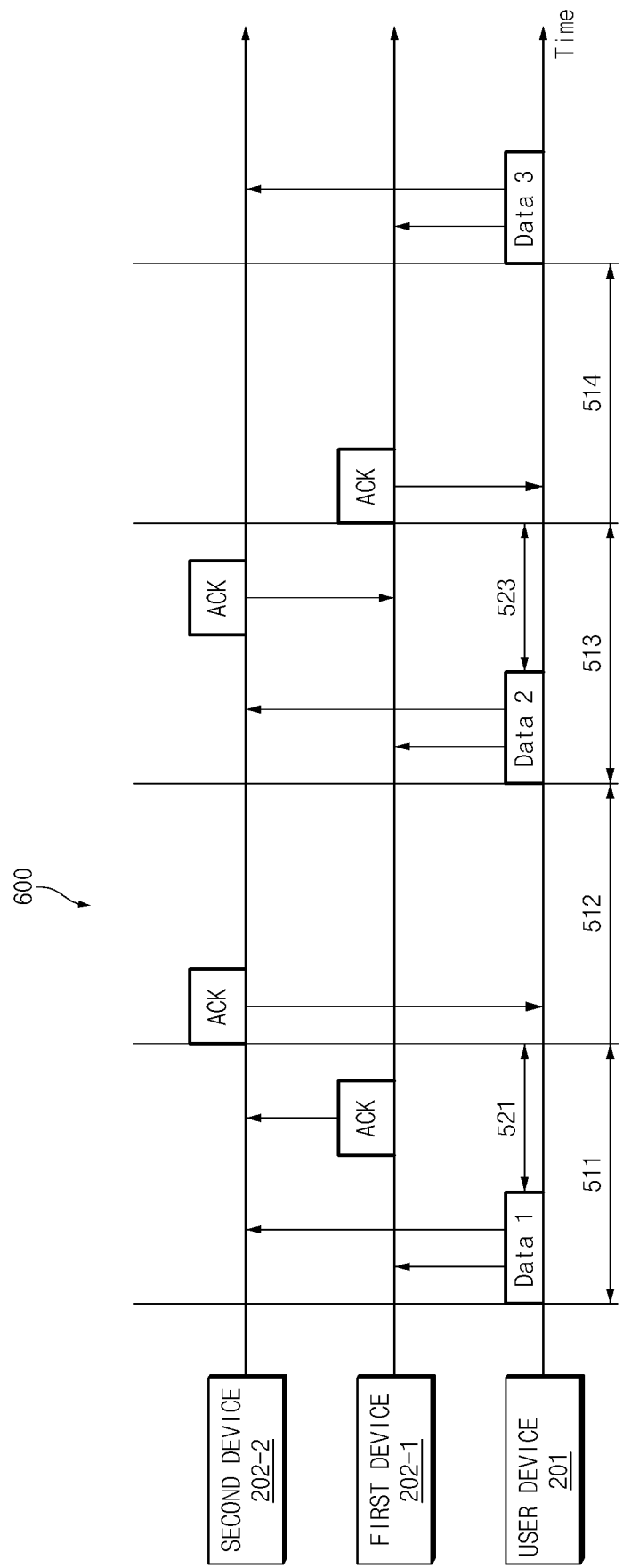
FIG. 6 illustrates an operation of changing a function of transmitting a response message, according to certain embodiments.

FIG. 6 illustrates an operation of changing a function of transmitting a response message, according to certain embodiments.

Referring to FIG. 6, a horizontal axis of graph 600 may indicate a time. The user device 201 may transmit a data packet in the first slot 511, the third slot 513, and a fifth slot 515 (e.g., transmit slots) and may receive a response message in the second slot 512 and a fourth slot 514 (e.g., receive slots).

According to certain embodiments, the first device 202-1 and the second device 202-2 may change a function of transmitting a message indicating "NACK (or ACK)" in every specific period.

According to an embodiment, the first device 202-1 and the second device 202-2 may change functions thereof whenever the data packet is transmitted from the user device 201. For example, in the first device 202-1 and the second device 202-2, the first device 202-1 may transmit the response message indicating "ACK" to the second device 202-2, and the second device 202-2 may transmit the response message indicating "ACK" to the user device 201 according to an embodiment illustrated in FIGS. 5A to 5C, when the first data packet is transmitted from the user device 201 in the first slot 511. Although not illustrated in FIG. 6, when a first data packet is not normally received by the first device 202-1, the first device 202-1 may transmit the response message indicating "NACK" to the user device 201 or the second device 202-2, and the second device 202-2 may not transmit the response message. When a second data packet is transmitted in the third slot 513 (alternatively, when the first data packet is retransmitted), the second device 202-2 may transmit the response message indicating "ACK" to the first device 202-1 and the first device 202-1 may transmit the response message indicating "ACK" to the user device 201. In this case, the second device 202-2 may transmit the response message indicating "ACK" to the first device 202-1 for a fourth time interval 523 in the third slot 513 except for the third time interval for which the second data packet is transmitted, and the first device 202-1 may transmit the response message indicating "ACK" to the user device 201 in the fourth slot 514. Although not illustrated in FIG. 6, when the second data packet is not normally received by the second device 202-2, the second device 202-2 may transmit the response message indicating "NACK" to the user device 201 in the fourth slot 514 and may transmit the response message indicating "NACK" to the first device 202-1 for the fourth time interval 523, and the first device 202-1 may not transmit the response message to the user device 20 in the fourth slot 514, because the first device 202-1 fails to receive the response message indicating "ACK" from the second device 202-2 for the fourth time interval 523.

According to certain embodiments, the first device 202-1 and the second device 202-2 may change the functions thereof when a specific time is elapsed regardless of the number of data packets transmitted from the user device 201. For example, the first device 202-1 and the second device 202-2 may start a timer when receiving an initial data packet (e.g., the first data packet) from the user device 201, and may change the functions thereof after the timer is expired. In this case, the first device 202-1 and the second device 202-2 may exchange information associated with the timer in the operations of determining a manner for transmitting the response message. For another example, the first device 202-1 and the second device 202-2 may change the functions thereof based on at least one of a battery status or a user input.

Figure 7:
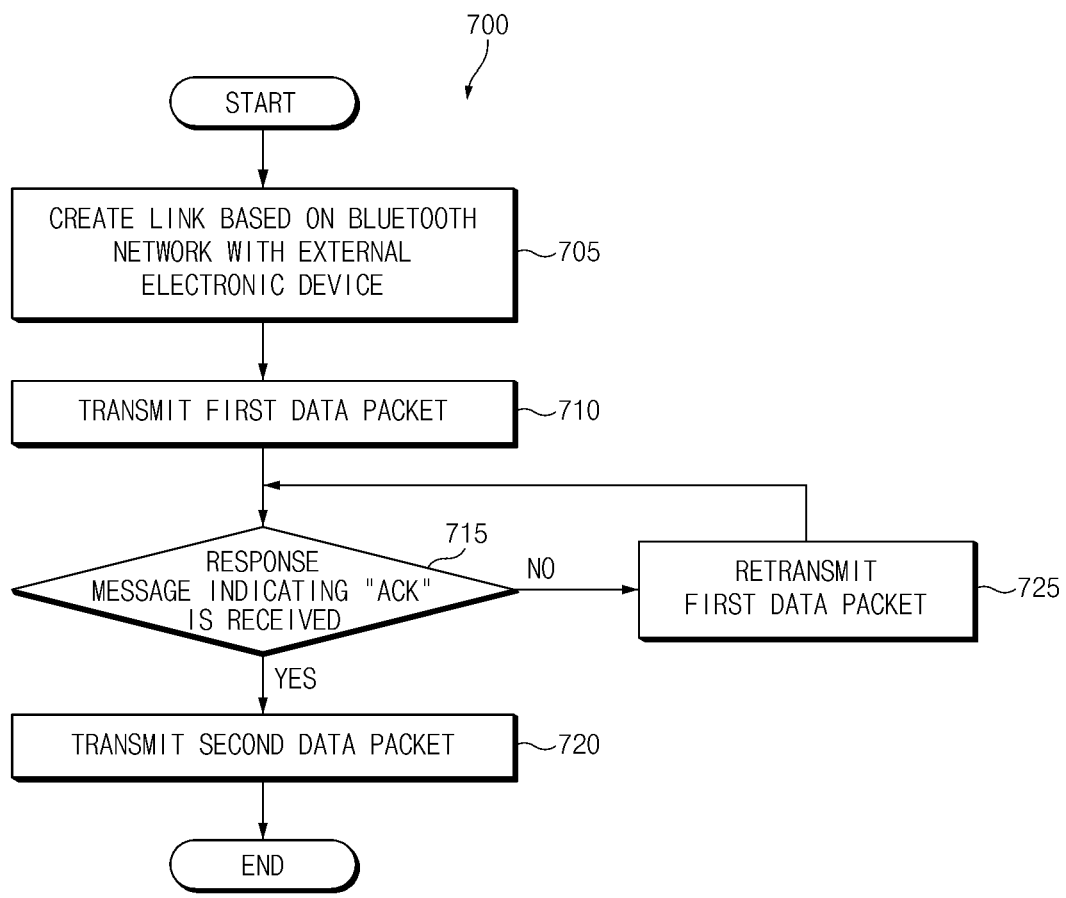
FIG. 7 illustrates a flowchart for an operation of an electronic device to transmit a response message, according to certain embodiments.

FIG. 7 illustrates a flowchart for an operation of an electronic device to transmit a response message, according to certain embodiments. Embodiments illustrated in FIG. 7 may be performed by the user device 201 of FIG. 2. The user device 201 may perform operations based on flowchart 700 through at least one component (e.g., the processor 120 or the wireless communication module 192 of FIG. 1) included in the user device 201.

Referring to FIG. 7, in operation 705, an electronic device may create a link (e.g., the first link 205 of FIG. 2) based on a Bluetooth network with an external electronic device (e.g., the first device 202-1 of FIG. 2) through a processor and a wireless communication circuitry.

In operation 710, the electronic device may transmit a first data packet including content to the external electronic device through the processor and the wireless communication circuitry. According to an embodiment, the electronic device may transmit the first data packet to the external electronic device through the link created in operation 705.

In operation 715, the electronic device may identify whether a response message indicating "ACK" is received.

When the response message indicating "ACK" is received, the electronic device may transmit, to the external electronic device, a second data packet corresponding to a data packet next to the first data packet in operation 720.

When a response message indicating "NACK" is received or any response message is not received within a specific time, the electronic device may retransmit the first data packet in operation 725. The electronic device may repeatedly perform operations 715 and 725 until the response message indicating "ACK" is received. According to an embodiment, the electronic device may directly retransmit the first data packet or may request the external electronic device to relay a data packet.

Although not illustrated in FIG. 7, the electronic device 101 may perform operation 720 even if the response message indicating "ACK" is not received, when the number of times, in which the electronic device performs operation 725, exceeds a threshold value or when a specific time is elapsed from a time point at which operation 710 is performed.

Figure 8:
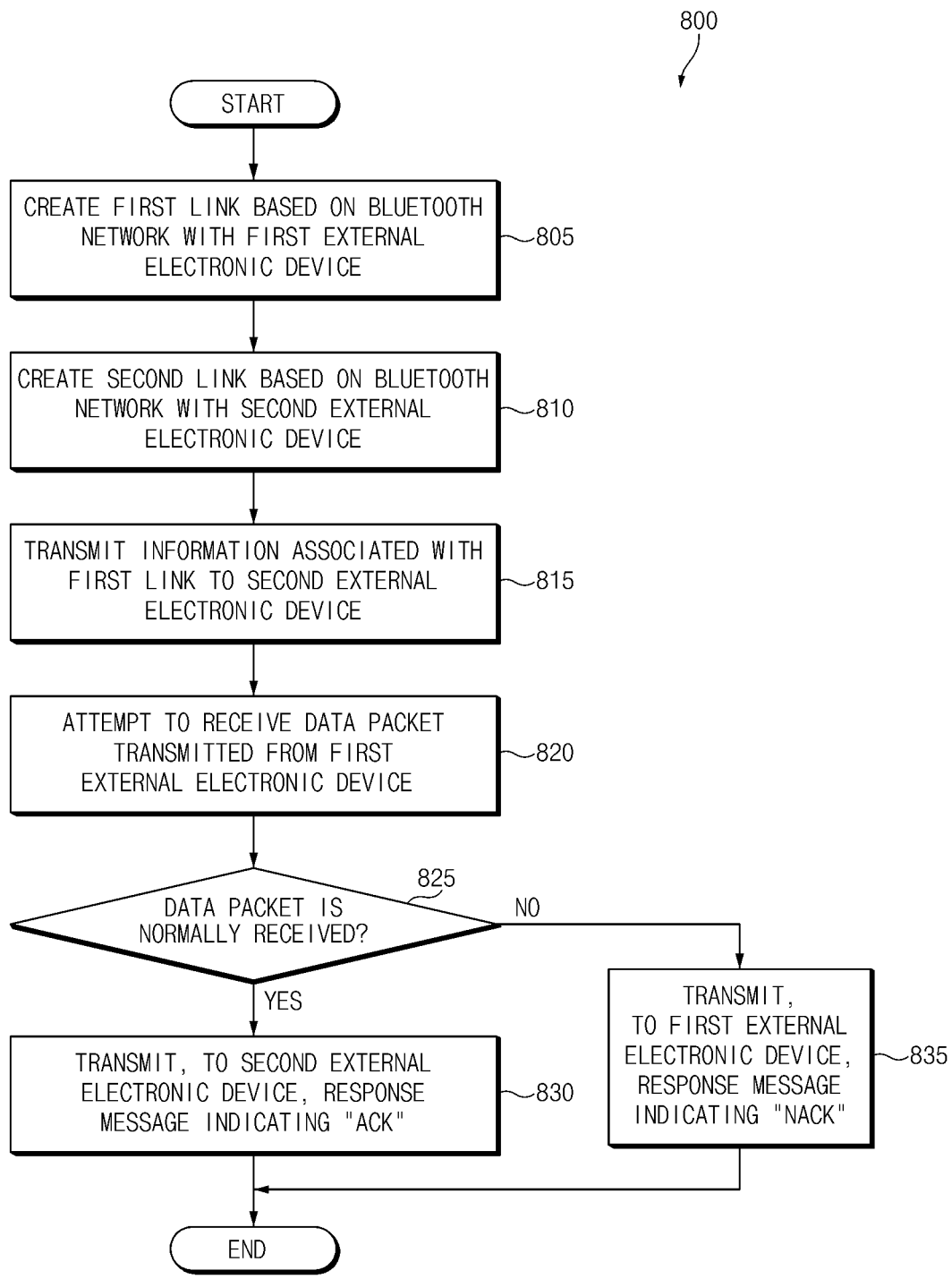
FIG. 8 illustrates a flowchart for an operation of an electronic device to transmit a response message, according to certain embodiments.

FIG. 8 is flowchart 800 illustrating an operation of an electronic device to receive a response message according to certain embodiments. Embodiments illustrated in FIG. 8 may be performed by the first device 202-1 of FIG. 2. The first device 202-1 may perform operations based on flowchart 800 through at least one component (e.g., the processor 120 and the wireless communication module 192 of FIG. 1) included in the first device 202-1.

Referring to FIG. 8, in operation 805, an electronic device may create a first link (e.g., the first link 205 of FIG. 2) based on a Bluetooth network with a first external electronic device (e.g., the user device 201 of FIG. 2) through a processor and a wireless communication circuitry.

In operation 810, the electronic device may create a second link (e.g., the second link 215 of FIG. 2) based on a Bluetooth network with a second external electronic device (e.g., the second device 202-2 of FIG. 2) through the processor and the wireless communication circuitry. According to an embodiment, the electronic device may create the second link while maintaining the first link. According to other embodiments, the electronic device may create the first link with the first external electronic device, after creating the second link with the second external electronic device.

In operation 815, the electronic device may transmit information associated with the first link to the second external electronic device through the processor and the wireless communication circuitry. According to an embodiment, the information associated with the first link may include information used for the second external electronic device to monitor the first link. The information associated with the first link may include, for example, at least one of address information, clock information, channel information, SDP result information, information on supported functions, key information, or an EIR packet.

In operation 820, the electronic device may attempt to receive a data packet from the first external electronic device through the processor and the wireless communication circuitry. For example, the electronic device 101 may attempt to receive the data packet in the first slot (e.g., the first slot 511 of FIG. 5B) through the first link.

In operation 825, the electronic device may identify whether the data packet is normally received, through the processor.

When the data packet is normally received, the electronic device 101 may transmit, to the second external electronic device, the response message indicating "ACK" through the processor and the wireless communication circuitry in operation 830. According to an embodiment, the electronic device 101 may transmit the response message indicating "ACK" for a second time interval in a first slot except for a first time interval for which a data packet is received.

When the data packet is not normally received, the electronic device may transmit, to the first external electronic device, the response message indicating "NACK" through the processor and the wireless communication circuitry in operation 835. For example, the electronic device may transmit the response message indicating "NACK" through the first link. According to an embodiment, the electronic device may transmit a response message indicating "NACK" in a second slot corresponding to a slot next to the first slot.

According to an embodiment, the electronic device may repeatedly perform operation 820 to 830 (or operation 835) whenever attempting to receive the data packet. For example, the electronic device may perform operation 820 to operation 830 (or operation 835) with respect to a specific data packet and may perform operation 820 to operation 830 (or operation 835) with respect to a next data packet.

According to certain embodiments, the electronic device may change the function of transmitting the response message in every specific period (or the number of times) as illustrated in FIG. 6. For example, the electronic device may perform operations based on flowchart 900 illustrated in FIG. 9.

Figure 9:
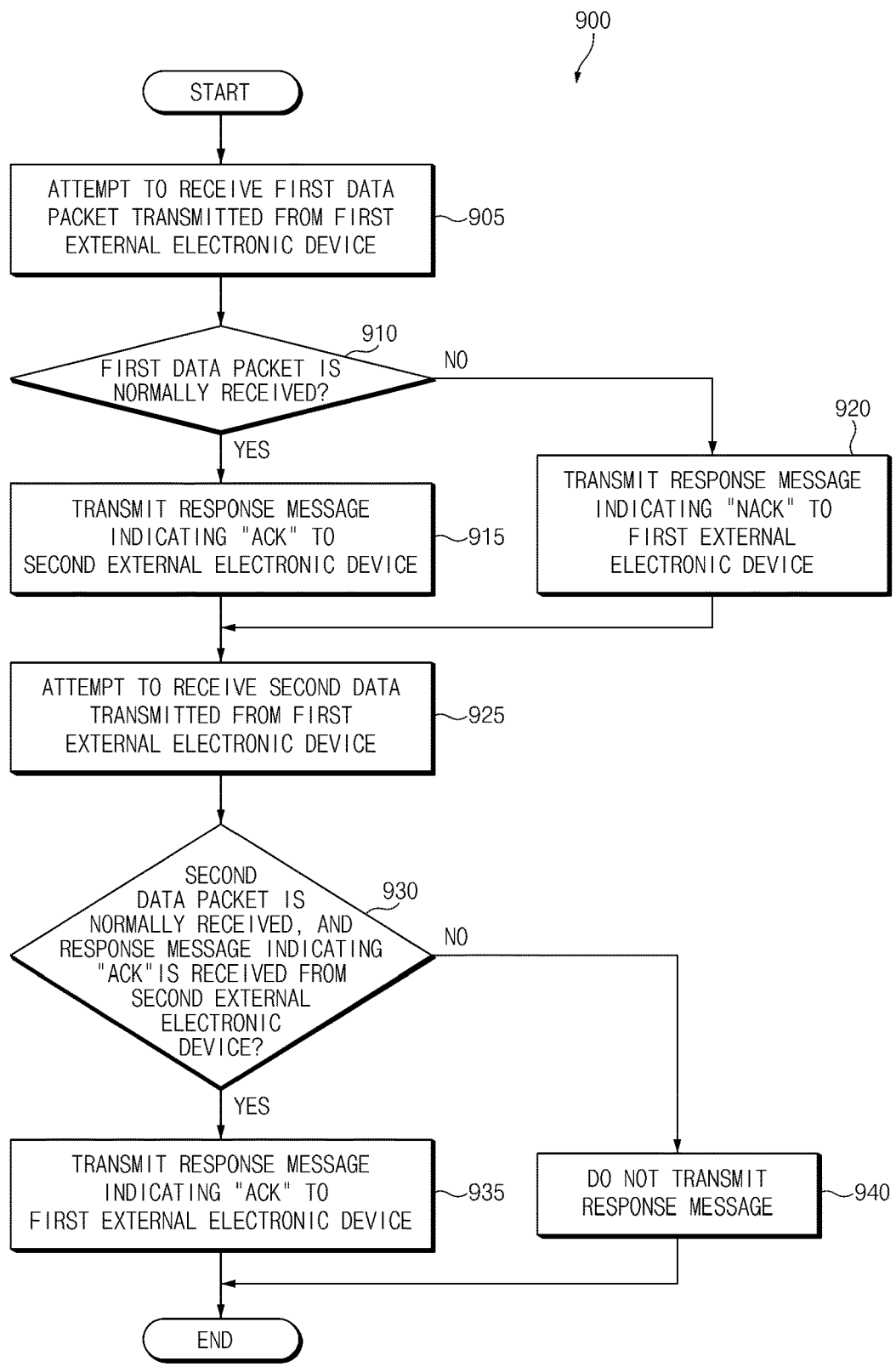
FIG. 9 illustrates a flowchart for an operation of an electronic device to transmit a response message, according to certain embodiments.

FIG. 9 is flowchart 900 illustrating another operation of an electronic device to receive a response message, according to certain embodiments. Embodiments illustrated in FIG. 9 may be performed by the first device 202-1 of FIG. 2. According to an embodiment, the electronic device may perform the operations illustrated in FIG. 9 after performing operation 815 of FIG. 8.

Referring to FIG. 9, in operation 905, the electronic device may attempt to receive the first data packet transmitted from the first external electronic device (e.g., the user device 201 of FIG. 2) through the processor and the wireless communication circuitry. For example, the electronic device may attempt to receive the first data packet in the first slot through the first link (e.g., the first link 205 of FIG. 2).

In operation 910, the electronic device may identify whether the first data packet is normally received, through the processor. When the first data packet is normally received, in operation 915, the electronic device may transmit a response message indicating "ACK" to a second external electronic device (e.g., the second device 202-2 of FIG. 2) through the processor and the wireless communication circuitry (e.g., operation 830 of FIG. 8). When the first data packet is not normally received, in operation 920, the electronic device may transmit, to the first external electronic device, the response message indicating "NACK" through the processor and the wireless communication circuitry (operation 835 of FIG. 8).

In operation 925, the electronic device may attempt to receive a second data packet transmitted from the first external electronic device through the processor and the wireless communication circuitry. The second data packet may be, for example, the same packet as the first data packet or a data packet next to the first data packet. According to an embodiment, the electronic device may attempt to receive the second data packet in the third slot corresponding to the slot next to the second slot.

In operation 930, the electronic device may identify whether the second data packet is normally received, and the response message indicating "ACK" for the second data packet is received from the second external electronic device, through the processor. According to an embodiment, the electronic device may identify whether the response message is received from the second external electronic device for a fourth time interval in the third slot except for a third time interval, for which the second data packet is received.

When the response message indicating "ACK" is not received from the second external electronic device until the third slot is terminated, or when the second data packet is not normally received by the electronic device, the electronic device may not transmit the response message to the first external electronic device in operation 940.

When the second data packet is normally received by the electronic device and when the response message indicating "ACK" is received from the second external electronic device before the third slot is terminated (or during the fourth time interval), the electronic device may transmit, to the first external electronic device, the response message indicating "ACK" through the processor and the wireless communication circuitry in operation 935. According to an embodiment, the electronic device may transmit the response message indicating "ACK" in the fourth slot corresponding to a slot next to the third slot.

According to an embodiment, the electronic device may alternately perform operation 915 and operation 920, and operation 935 to operation 940 in every period. For example, the electronic device may perform operation 915 and operation 920, and operation 935 to operation 940, depending on a battery status of the electronic device or the second external electronic device, a user input, or the combination thereof, when a specified time is elapsed regardless of the number of received data packets, whenever the data packet is received from the first external electronic device.

Figure 10:
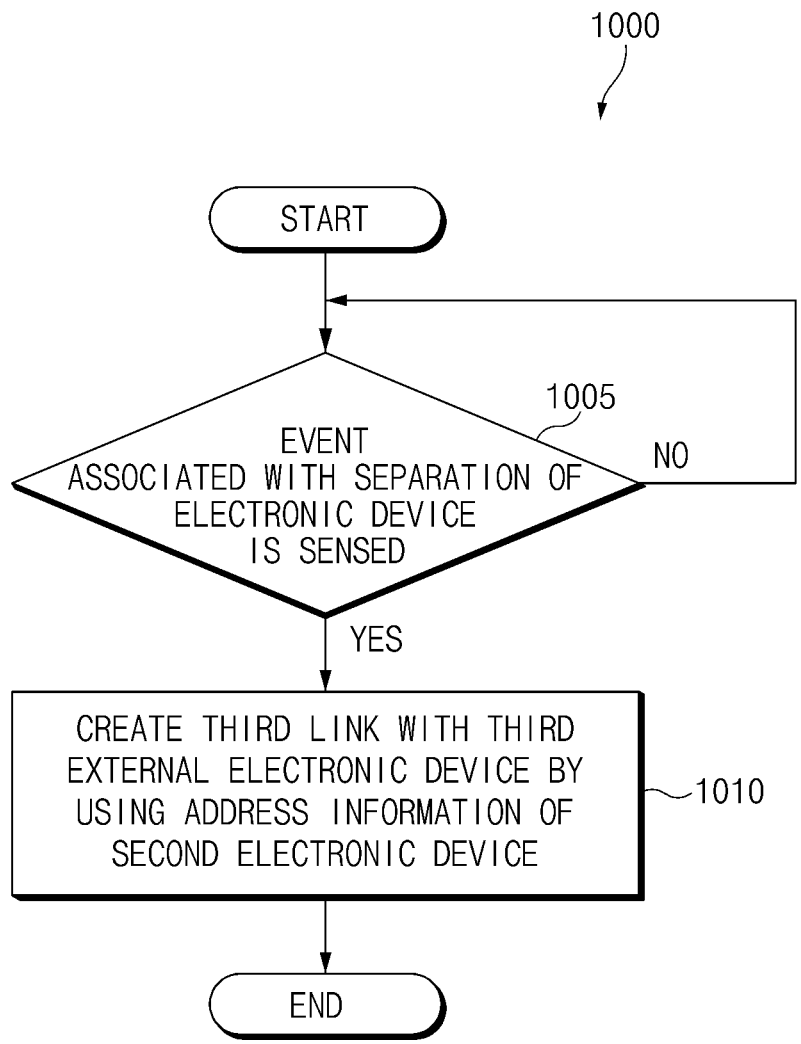
FIG. 10 is a flowchart for an operation of an electronic device to change address information, according to certain embodiments.

FIG. 10 illustrates flowchart 1000 for an operation of an electronic device to exchange address information, according to certain embodiments. Embodiments illustrated in FIG. 10 may be performed by the first device 202-1 of FIG. 2. According to an embodiment, the electronic device may perform the operations illustrated in FIG. 10 after performing operation 830 or operation 835 of FIG. 8, or operation 935 or operation 940 of FIG. 9.

Referring to FIG. 10, in operation 1005, the electronic device may identify whether an event associated with the separation of the electronic device is sensed. For example, the electronic device may determine the event associated with the separation of the electronic device as being sensed, when a signal (e.g., an escaping indication signal) associated with the separation is received through the first link (e.g., the first link 205 of FIG. 2), when the electronic device is powered off, when the electronic device determines the separation of the electronic device through a second link (e.g., the second link 215 of FIG. 2) together with the second external electronic device (e.g., the second device 202-2 of FIG. 2), when the second link is disconnected, when the electronic device is removed from the user, or when the electronic device is set to be mute. The electronic device may repeat operation 1005, when the event associated with the separation of the electronic device is not sensed.

When the event associated with the separation of the electronic device is sensed, in operation 1010, the electronic device may use address information (e.g., a second BT address) of the second external electronic device instead of address information (e.g., a first Bluetooth (BT) address) of the electronic device. The second external electronic device may receive a data packet from the first external electronic device or transmit a response message to the first external electronic device, by using the address information of the electronic device. Meanwhile, the electronic device may create a new link (e.g., a third link) with another external electronic device (e.g., a third external electronic device) other than the first external electronic device by using the address information of the second external electronic device.

According to an embodiment, the electronic device may exchange address information of the second external electronic device through signaling. According to another embodiment, the electronic device may previously obtain the address information of the second external electronic device. For example, the electronic device may obtain the address information of the second external electronic device from the second external electronic device while creating the second link (e.g., the second link 215 of FIG. 2).

Figure 11:
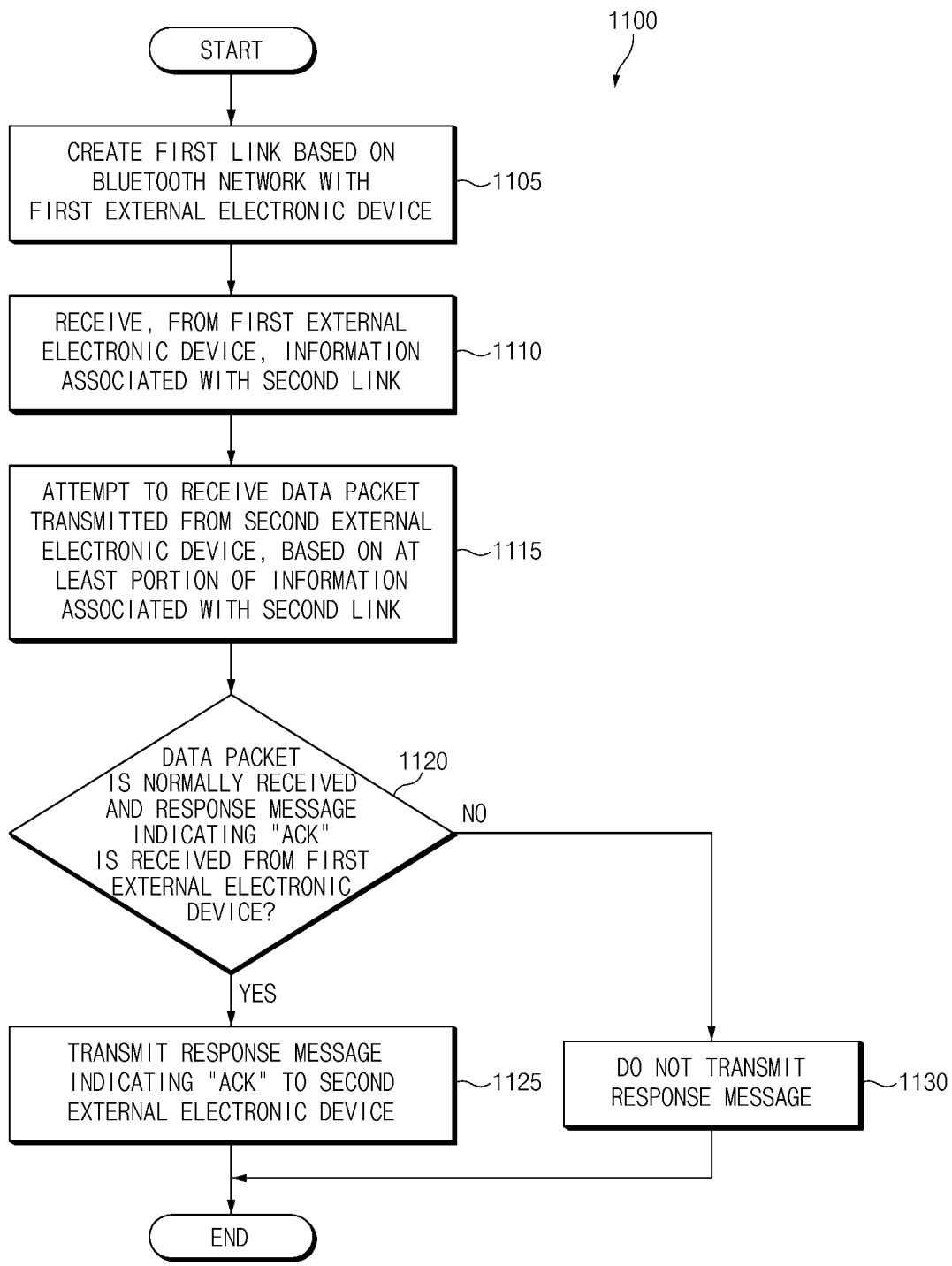
FIG. 11 illustrates a flowchart for another operation of an electronic device to receive a response message, according to certain embodiments.

FIG. 11 illustrates a flowchart for another operation of an electronic device to receive a response message, according to certain embodiments. Embodiments illustrated in FIG. 11 may be performed by the second device 202-2 of FIG. 2. The second device 202-2 may perform operations based on flowchart 1100 through at least one component (e.g., the processor 120 and the wireless communication module 192 of FIG. 2) included in the second device 202-2.

Referring to FIG. 11, in operation 1105, an electronic device may create a first link (e.g., the second link 215 of FIG. 2) based on a Bluetooth network with a first external electronic device (e.g., the first device 202-1 of FIG. 2) through the processor and the wireless communication circuitry.

In operation 1110, the electronic device may receive, from the first external electronic device, information associated with a second link (e.g., the first link 205 of FIG. 2) created between the first external electronic device and a second external electronic device (e.g., the user device 201 of FIG. 2) through the processor and the wireless communication circuitry. The information associated with the second link may include, for example, at least one of address information, clock information, channel information, SDP result information, information on supported functions, key information, or an EIR packet.

According to an embodiment, the electronic device may receive information associated with the second link from the first external electronic device before the first link is created or while the first link is created. According to an embodiment, the electronic device may receive information associated with the second link from the first external electronic device through another device (e.g., the external server).

In operation 1115, the electronic device may attempt to receive a data packet transmitted from the second external electronic device, based on at least a portion of the information associated with the second link, through the processor and the wireless communication circuitry. For example, the electronic device may determine a hopping channel of the first link based on the address information and the clock information, and may monitor the determined hopping channel, thereby attempting to receive the data packet from the second external electronic device. According to an embodiment, the electronic device may attempt to receive the data packet in at least a partial interval (e.g., the first time interval) in the first slot.

In operation 1120, the electronic device may identify whether the data packet is normally received, and whether a response message indicating "ACK" for the data packet is received from the first external electronic device through the processor. According to an embodiment, the electronic device 101 may identify whether the response message indicating "ACK" is received for the second time interval in the first slot except for the first time interval.

When the data packet is normally received by the electronic device and when the response message indicating "ACK" is received from the first external electronic device before the first slot is terminated (or during the second time interval), the electronic device may transmit, to the second external electronic device, the response message indicating "ACK" through the processor and the wireless communication circuitry in operation 1125. The electronic device may transmit the response message indicating "ACK" based at least partially on the information associated with the second link. For example, the electronic device may generate an access code corresponding to the second link and may transmit a response message including the generated access code to the second external electronic device (e.g., the user device 201). According to an embodiment, the electronic device may transmit a response message indicating "ACK" in a second slot corresponding to a slot next to the first slot. 52

When the data packet is not normally received from the electronic device or when the response message indicating "ACK" is not received from the first external electronic device until the first slot is terminated, the electronic device may not transmit the response message in operation 1130.

According to an embodiment, the electronic device may repeatedly perform operation 1115 to operation 1125 (or operation 1130) whenever attempting to receive the data packet. For example, the electronic device may perform operation 1115 to operation 1125 (or operation 1130) with respect to a specific data packet and may perform operation 1115 to operation 1125 (or operation 1130) with respect to a next data packet.

According to another embodiment, the electronic device may change the function of transmitting the response message in every specific period (or the number of times) as illustrated in FIG. 6. For example, the electronic device may operation based on flowchart 1200 illustrated in FIG. 12.

Figure 12:
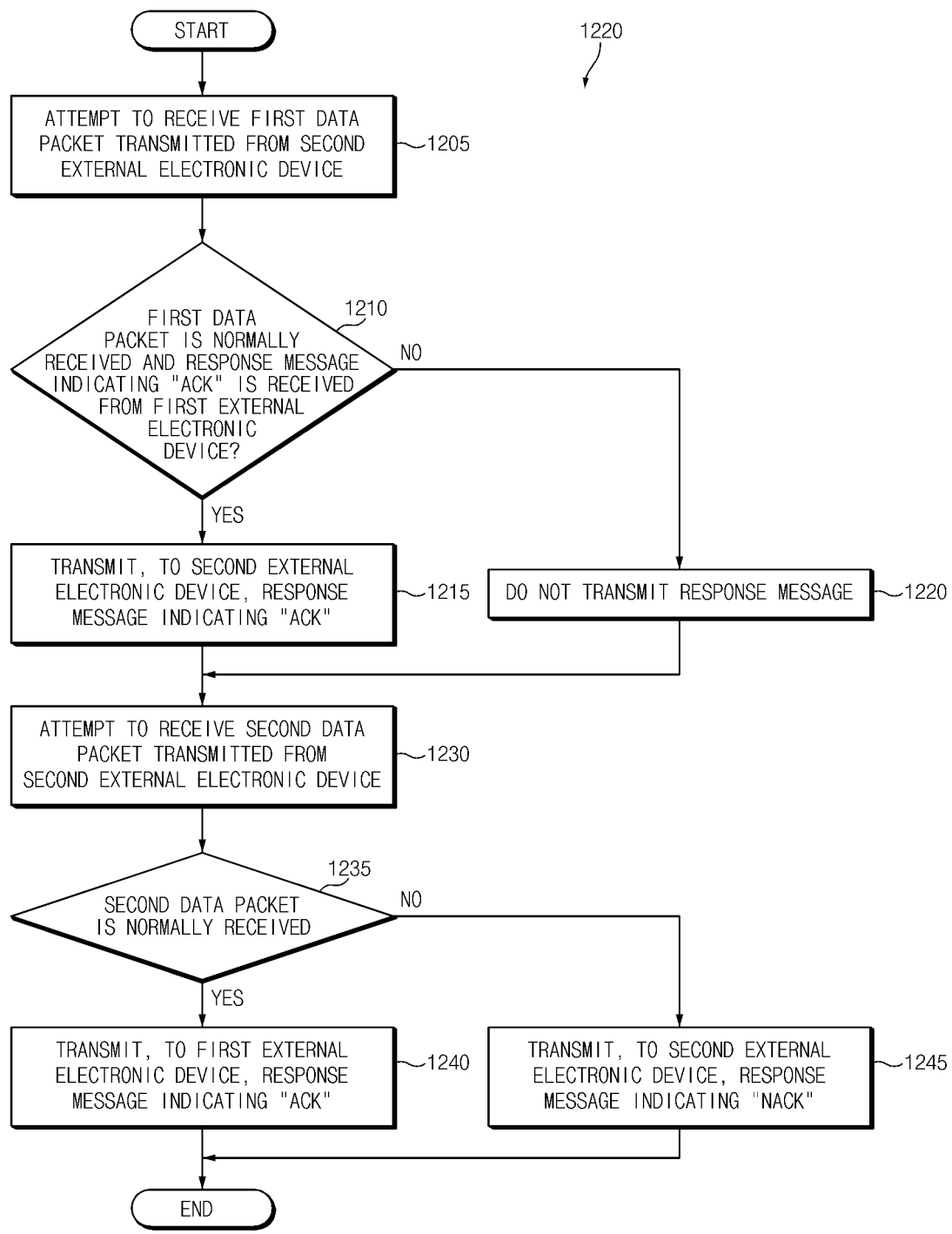
FIG. 12 illustrates a flowchart for another operation of an electronic device to receive a response message, according to certain embodiments.

FIG. 12 is flowchart 1200 illustrating an operation of an electronic device to receive a response message according to certain embodiments. Embodiments illustrated in FIG. 12 may be performed by the second device 202-2 of FIG. 2. According to an embodiment, the electronic device may perform the operations illustrated in FIG. 12 after performing operation 1110 of FIG. 11.

Referring to FIG. 12, in operation 1205, the electronic device may attempt to receive a first data packet transmitted from the second external electronic device through the processor and the wireless communication circuitry. According to an embodiment, the electronic device may attempt to receive the first data packet in the first slot.

In operation 1210, the electronic device may identify whether the first data packet is normally received and a response message indicating "ACK" is received from the first external electronic device, by the electronic device through the processor (e.g., operation 1120 of FIG. 11). When the first data packet is normally received and the response message indicating "ACK" is received by the electronic device, in operation 1215, the electronic device may transmit, to the second external electronic device, the response message indicating "ACK" through the processor and the wireless communication circuitry (e.g., operation 1125 of FIG. 11). When the response message indicating "ACK" is not received or when the response message indicating "NACK" is received from the first external electronic device, the electronic device may not transmit the response message (e.g., operation 1130 of FIG. 11).

In operation 1230, the electronic device may attempt to receive a second data packet transmitted from the second external electronic device through the processor and the wireless communication circuitry. According to an embodiment, the electronic device may attempt to receive the second data packet in at least a partial section (e.g., the third time interval) of the third slot corresponding to a slot next to the second slot.

In operation 1235, the electronic device may identify whether the second data packet is normally received, through the processor.

When the second data packet is normally received, in operation 1240, the electronic device 101 may transmit, to the first external electronic device, the response message indicating "ACK" through the processor and the wireless communication circuitry. According to an embodiment, the electronic device may transmit, to the first external electronic device, the response message indicating "ACK" is received for the fourth time interval in the third slot except for the third time interval.

When the data packet is not normally received, the electronic device may transmit, to the second external electronic device, the response message indicating "NACK" to the second data packet through the processor and the wireless communication circuitry in operation 1245. According to an embodiment, the electronic device may transmit a response message indicating "NACK" in a fourth slot corresponding to a slot next to the third slot. For example, the electronic device may generate an access code corresponding to the second link and may transmit a response message including the generated access code to the second external electronic device (e.g., the user device 201).

According to an embodiment, the electronic device may alternately perform operation 1215 and operation 1220, and operation 1240 and operation 1245 in every specified period. For example, the electronic device may perform operation 1215 and operation 1220, and operation 1240 and operation 1245, depending on a battery status of the electronic device or the first external electronic device, a user input, or the combination thereof, when a specified time is elapsed regardless of the number of received data packets whenever the data packet is received from the second external electronic device.

Figure 13:
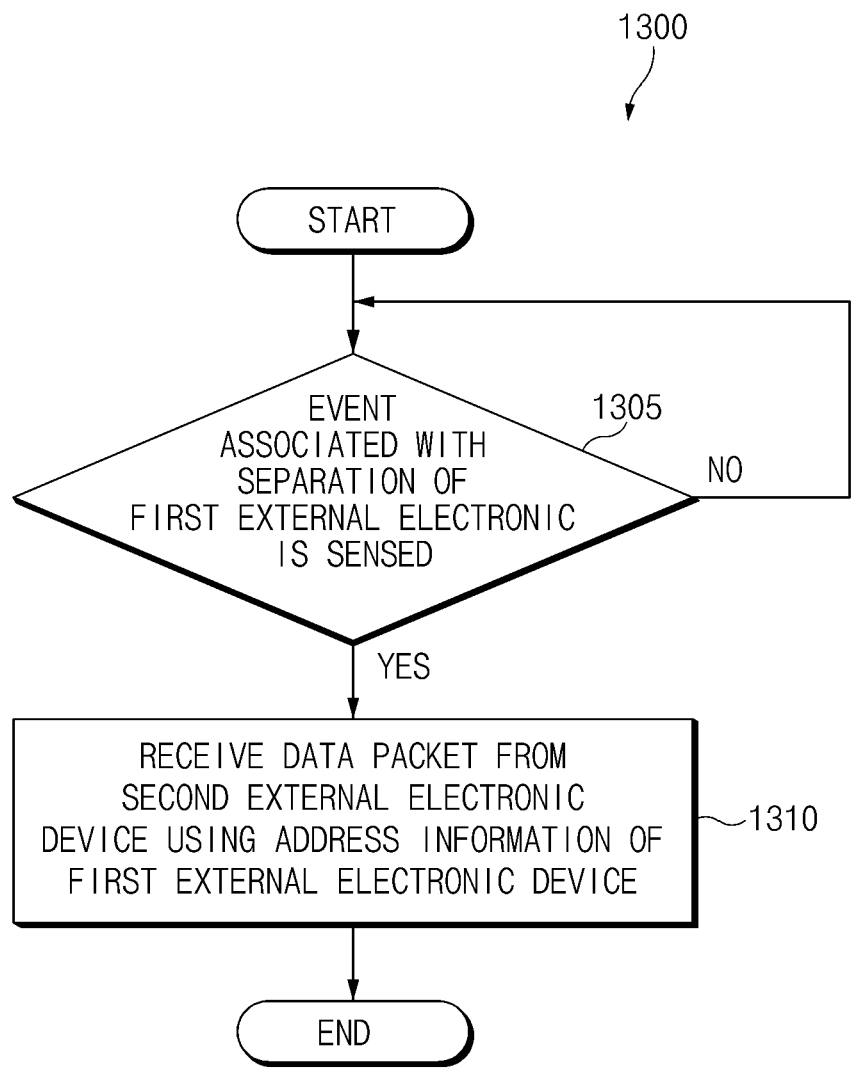
FIG. 13 is a flowchart illustrating another operation of an electronic device to change address information, according to certain embodiments.

FIG. 13 is flowchart 1300 illustrating an operation of an electronic device to exchange address information, according to certain embodiments. Embodiments illustrated in FIG. 13 may be performed by the second device 202-2 of FIG. 2. According to an embodiment, the electronic device may perform operations illustrated in FIG. 13 after performing operation 1125 or operation 1130 of FIG. 11, or operation 1240 or operation 1245 of FIG. 12.

Referring to FIG. 13, in operation 1305, the electronic device may identify whether an event associated with the separation of the first external electronic device (e.g., the first device 202-1 of FIG. 1) is sensed. For example, the electronic device may determine the event associated with the separation of the electronic device as being sensed, when the first external electronic device is powered off, when the electronic device determines the separation of the first external electronic device through the first link (e.g., the second link 215 of FIG. 2) with the first external electronic device, when the first link is disconnected, when the first external electronic device is removed from the user, or when the first external electronic device is set to be mute. The electronic device may repeatedly perform operation 1305, when the event associated with the separation of the first external electronic device is not sensed.

When the event associated with the separation of the first external electronic device is sensed, in operation 1310, the electronic device may receive a data packet from the second external electronic device or may transmit a response message to the second external electronic device, by using address information (e.g., the first BT address) of the first external electronic device.

According to an embodiment, the electronic device may exchange the address information of the first external electronic device through signaling. According to another embodiment, the electronic device may previously obtain the address information of the first external electronic device. For example, the electronic device may obtain the address information of the first external electronic device from the first external electronic device while generating the first link (e.g., the second link 215 of FIG. 1). For another, the address information of the first external electronic device may be included in information associated with the second link (e.g., the first link 205 of FIG. 2).

As described above, according to an embodiment, an electronic device (e.g., the first device 202-1 of FIG. 2) may include a wireless communication circuitry (e.g., at least a portion of the wireless communication module 192 of FIG. 1) configured to support a Bluetooth network, at least one processor (e.g., the processor of FIG. 1) operatively connected with the wireless communication circuitry, and a memory (e.g., the memory 130 of FIG. 1) operatively connected with the at least one processor. The memory may store instructions that when executed cause the at least one processor to perform a plurality of operations comprising, creating a first link (e.g., the first link 205 of FIG. 2) with a first external electronic device (e.g., the user device 201 of FIG. 2), based on the Bluetooth network, creating a second link (e.g., the second link 215 of FIG. 2) with a second external electronic device (e.g., the second device 202-2 of FIG. 2), based on the Bluetooth network, transmitting, to the second external electronic device, information associated with the first link, through the second link, transmitting a response message indicating "ACK" to the second external electronic device through the second link when a first data packet is normally received, and to transmitting a response message indicating "NACK" to the first external electronic device through the first link, when the first data packet is not normally received.

According to an embodiment, the plurality of operations further comprises attempting to receive the first data packet for a first time interval in a first slot (e.g., the first slot 511 of FIG. 5A) through the wireless communication circuitry, transmitting the response message indicating "ACK" for a second time interval (e.g., the second time interval 521 of FIG. 5A) in the first slot except for the first time interval, when the first data packet is normally received, and transmitting the response message indicating "NACK" in a second slot (e.g., the second slot 512 of FIG. 5A) corresponding to a slot next to the first slot, when the first data packet is not normally received.

According to an embodiment, the instructions may cause the processor to determine a function of a master device and a function of a slave device together with the second external electronic device while performing the second link, and to transmit the response message indicating "NACK" to the first external electronic device, based on that the electronic device is determined to perform the function of the master device.

According to an embodiment, the plurality of operations further comprises transmitting the response message indicating "NACK" to the first external electronic device, based on whether the electronic device transmits information associated with the first link to the second external electronic device.

According to an embodiment, the plurality of operations further comprises attempting to receive a second data packet transmitted from the first external electronic device through the first link, for a third time interval in a third slot (e.g., the third slot 513 of FIG. 6) corresponding to a slot next to the second slot, identifying whether a response message is received from the second external electronic device through the second link, for a fourth time interval (e.g., the fourth time interval 523 of FIG. 6) except for the third time interval, transmitting a response message indicating "ACK" for the second data packet to the first external electronic device in a fourth slot (e.g., the fourth slot 514 of FIG. 6) corresponding to a slot next to the third slot, when the second data packet is normally received, and when the response message is received from the second external electronic device, and withholding transmission of the response message for the second data packet in the fourth slot, when the second data packet is not normally received or when the response message is not received from the second external electronic device.

According to an embodiment, the plurality of operations further comprises creating a link with a third external electronic device based on the Bluetooth network using address information of the second external electronic device, in response to sensing an event associated with separation of the electronic device.

According to an embodiment, the plurality of operations further comprises sensing the event, when the electronic device is powered off, when the electronic device receives a signal, which is associated with the separation, through the first link, when the electronic device determines the separation of the electronic device through the second link with the second external electronic device, when the second link is disconnected, when the electronic device is removed from the user, or when the electronic device is set to be mute.

According to an embodiment, the plurality of operations further comprises transmitting the response message indicating "NACK" to the second external electronic device through the second link, when the first data packet is not normally received As described above, according to an embodiment, an electronic device (e.g., the second device 202-2 of FIG. 2) may include a wireless communication circuitry (e.g., at least a portion of the wireless communication module 192 of FIG. 1) configured to support a Bluetooth network, at least one processor (e.g., the processor 120 of FIG. 1), and a memory (e.g., the memory 130 of FIG. 1) operatively connected with the at least one processor. The memory may store instructions that when executed cause the at least one processor to perform a plurality of operations comprising establishing a first link (e.g., the second link 215 of FIG. 2) with a first external electronic device (e.g., the first device 202-1 of FIG. 2), based on the Bluetooth network, receiving information associated with a second link (e.g., the first link 205 of FIG. 2) created between the first external electronic device and the second external electronic device (e.g., the user device 201 of FIG. 2), from the first external electronic device, attempting to receive the first data packet transmitted from the second external electronic device by monitoring the second link based at least partially on the information associated with the second link, identifying whether the response message is received from the first external electronic device, transmitting, to the second external electronic device, the response message indicating "ACK" for the first data packet, when the first data packet is normally received, and when the response message is received from the first external electronic device, and withholding the response message for the first data packet, when the first data packet is not normally received or when the response message is not received from the first external electronic device.

According to an embodiment, the plurality of operations further comprises attempting to receive the first data packet for a first time interval in a first slot (e.g., the first slot 511 of FIG. 5A), identifying whether the response message is received from the first external electronic device for a second time interval (e.g., the second time interval 521 of FIG. 5A) in the first slot except for the first time interval, and transmitting the response message indicating "ACK" for the first data packet in the second slot (e.g., the second slot 512 of FIG. 5A) corresponding to the slot next to the first slot, when the first data packet is normally received, and when the response message is received from the first external electronic device.

According to an embodiment, the instructions cause the processor to determine a function of a master device and a function of a slave device together with the first external electronic device while establishing the second link, and to transmit the response message indicating "ACK" to the second external electronic device based on that the electronic device is determined to perform the function of the slave device.

According to an embodiment, the instructions cause the processor to transmit the response message indicating "ACK" to the second external electronic device, based on that the electronic device receives information associated with the second link to the second external electronic device.

According to an embodiment, the instructions may cause the processor to attempt to receive the second data packet transmitted from the second external electronic device by monitoring the second link, for the first time interval in the third slot (e.g., the third slot 513 of FIG. 6) corresponding to a slot next to the second slot, to transmit the response message indicating "ACK" for the second data packet to the first external electronic device, for a fourth time interval (e.g., the fourth time interval 523 of FIG. 6) in the third slot except for the third time interval, when the second data packet is normally received, and to transmit a response message indicating "NACK" for the second data packet to the second external electronic device in a fourth slot (e.g., the fourth slot 514 of FIG. 6) corresponding to a slot next to the third slot, when the second data packet is not normally received.

According to an embodiment, the instructions may cause the processor to make determination to transmit the response message indicating "ACK" for the second data packet to the first external electronic device, when a specified time is elapsed after the first data packet is received, based on a battery status of the first external electronic device, or when a user input is received.

According to an embodiment, the instructions may cause the processor to sense the event when the separation of the first external electronic device is determined through the first link with the first external electronic device, when the first external electronic device is removed from the user, or when the electronic device is set to be mute.

As described above, according to an embodiment, a method of an electronic device (e.g., the first device 202-1 of FIG. 2) may include creating a first link (e.g., the first link 205 of FIG. 2) with a first external electronic device (e.g., the user device 201 of FIG. 2), based on a Bluetooth network, creating a second link (e.g., the second link 215 of FIG. 2) with a second external electronic device (e.g., the second device 202-2 of FIG. 2), based on the Bluetooth network, transmitting, to the second external electronic device, information associated with the first link, through the second link, attempting to receive a first data packet transmitted from the first external electronic device through the first link, transmitting a response message indicating "ACK" to the second external electronic device through the second link when a first data packet is normally received, and transmitting a response message indicating "NACK" to the first external electronic device through the first link, when the first data packet is not normally received.

According to an embodiment, the method may further comprise determining a function of a master device and a function of a slave device together with the second external electronic device while establishing the second link, and the transmitting of the response message indicating "NACK" may include transmitting the response message indicating "NACK" to the first external electronic device, based on that the electronic device is determined to perform the function of the master device.

According to an embodiment, the transmitting of the response message indicating "NACK" may include transmitting the response message indicating "NACK" to the first external electronic device, based on whether the electronic device transmits information associated with the first link to the second external electronic device.

According to an embodiment, the method may further include attempting to receive the second data packet transmitted from the first external electronic device through the first link, identifying whether a response message is received from the second external electronic device through the second link, transmitting the response message indicating "ACK" for the second data packet to the first external electronic device when the second data packet is normally received and when the response message is received from the second external electronic device, and withholding transmission of the response message for the second data packet when the second data packet is not normally received or when the response message is not received from the second external electronic device.

According to an embodiment, the transmitting of the response message indicating "ACK" for the second data packet to the first external electronic device may further include making determination to transmit the response message indicating "ACK" for the second data packet to the first external electronic device, when a specified time is elapsed after the first data packet is received, based on a battery status of the electronic device or the second external electronic device, or when a user input is received.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuitry (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A system comprising a first electronic device and a second electronic device,
   wherein each of the first electronic device and the second electronic device comprises a wireless communication circuitry, a memory, and at least one processor,
   wherein the system is configured to perform a plurality of operations comprising:
   creating a first link between the first electronic device and an external electronic device, based on a Bluetooth network;
   creating a second link between the first electronic device and the second electronic device, based on the Bluetooth network;
   transmitting, to the second electronic device, information associated with the first link, through the second link;
   for a first time duration, configuring the first electronic device to transmit a first signal indicating "ACK" to the second electronic device in a case the first electronic device receives a first data packet from the external electronic device, and to transmit a response message indicating "NACK" to the external electronic device in a case that first electronic device fails to receive the first data packet; and
   for the first time duration, configuring the second electronic device to transmit a response message indicating "ACK" to the external electronic device in a case the second electronic device receives the first signal and the first data packet, and to transmit a response message indicating "NACK" to the external electronic device in a case the second electronic device fails to receive the first data packet;
   for a second time duration, configuring the second electronic device to transmit a second signal indicating "ACK" to the first electronic device in a case the second electronic device receives a second data packet from the external electronic device, and to transmit a response message indicating "NACK" to the external electronic device in a case that second electronic device fails to receive the second data packet; and
   for the second time duration, configuring the first electronic device to transmit a response message indicating "ACK" to the external electronic device in a case the first electronic device receives the second signal and the second data packet, and to transmit a response message indicating "NACK" to the external electronic device in a case the first electronic device fails to receive the second data packet.

2. The system of claim 1, wherein the plurality of operations further comprises:
   attempting to receive the first data packet for a first time interval in a first slot of the first time duration by the first electronic device;
   transmitting, by the first electronic device, the first signal for a second time interval in the first slot except for the first time interval, when the first data packet is received in the first time interval; and
   transmitting, by the first electronic device, the response message indicating "NACK" in a second slot of the first time duration, when the first data packet is not received in the first time interval, the second slot being subsequent to the first slot.

3. The system of claim 2, wherein the plurality of operations further comprises:
   attempting, by the first electronic device, to receive the second data packet through the first link, for a third time interval in a third slot corresponding to a slot next to the second slot;
   identifying, by the first electronic device, whether the second signal is received from the second electronic device through the second link, for a fourth time interval in the third slot except for the third time interval;
   transmitting, by the first electronic device, a response message indicating "ACK" for the second data packet to the external electronic device in a fourth slot corresponding to a slot next to the third slot, when the second data packet is received, and when the second signal is received from the second electronic device; and
   refraining from transmitting, by the first electronic device, a response message for the second data packet in the fourth slot, when the second signal is not received from the second electronic device,
   wherein the second time duration comprises the third slot and the fourth slot.

4. The system of claim 1, wherein the plurality of operations further comprises:
   creating a link, by the first electronic device, with a third external electronic device based on the Bluetooth network using address information of the second electronic device, in response to sensing an event associated with separation of the first electronic device.

5. The system of claim 4, wherein the plurality of operations further comprises:
   sensing the event, when the first electronic device is powered off, when the first electronic device receives a signal, which is associated with the separation, through the first link, when the external electronic device determines the separation of the first electronic device through the second link with the second electronic device, when the second link is disconnected, when the external electronic device is removed from a user, or when the first electronic device is set to be mute.

6. A method comprising:

creating a first link between a first electronic device and an external electronic device, based on a Bluetooth network;

creating a second link between the first electronic device and a second electronic device, based on the Bluetooth network;

transmitting, to the second electronic device, information associated with the first link, through the second link;

for a first time duration, configuring the first electronic device to transmit a first signal indicating "ACK" to the second electronic device in a case, based on whether the first electronic device receives a first data packet from the external electronic device, and to transmit a response message indicating "NACK" to the external electronic device in a case that first electronic device fails to receive the first data packet;

for the first time duration, configuring the second electronic device to transmit a response message indicating "ACK" to the external electronic device in a case the second electronic device receives the first signal and the first data packet, and to transmit a response message indicating "NACK" to the external electronic device in a case the second electronic device fails to receive the first data packet;

for a second time duration, configuring the second electronic device to transmit a second signal indicating "ACK" to the first electronic device in a case the second electronic device receives a second data packet from the external electronic device, and to transmit a response message indicating "NACK" to the external electronic device in a case that second electronic device fails to receive the second data packet; and for the second time duration, configuring the first electronic device to transmit a response message indicating "ACK" to the external electronic device in a case the first electronic device receives the second signal and the second data packet, and to transmit a response message indicating "NACK" to the external electronic device in a case the first electronic device fails to receive the second data packet.

7. The method of claim 6, further comprising:

attempting, by the first electronic device, to receive the second data packet through the first link;

identifying, by the first electronic device, whether the second signal is received from the second electronic device through the second link;

transmitting, by the first electronic device, a response message indicating "ACK" for the second data packet to the external electronic device, when the second data packet is received and when the second signal is received from the second electronic device; and refraining from transmitting a response message for the second data packet, when the response message is not received from the second electronic device.

8. The method of claim 7, wherein the transmitting, by the first electronic device, of the response message indicating "ACK" for the second data packet to the external electronic device further includes:

determining to transmit the response message indicating "ACK" for the second data packet to the external electronic device, when a specified time is elapsed after the first data packet is received, based on a battery status of the first electronic device or the second electronic device, or when a user input is received.

* * * * *